United States Patent [19]
Kakihara et al.

[11] Patent Number: 5,046,011
[45] Date of Patent: Sep. 3, 1991

[54] APPARATUS FOR NAVIGATING VEHICLE

[75] Inventors: Masaki Kakihara, Hiroshima; Masao Sasaki, Higashihiroshima, both of Japan

[73] Assignee: Mazda Motor Corporation, Hiroshima, Japan

[21] Appl. No.: 374,262

[22] Filed: Jun. 30, 1989

[30] Foreign Application Priority Data

Jul. 5, 1988 [JP] Japan ................................ 63-166026

[51] Int. Cl.$^5$ .............................................. G06F 15/50
[52] U.S. Cl. .................................... 364/449; 364/443; 364/450; 340/990
[58] Field of Search ............... 364/449, 450, 447, 443; 340/990, 995

[56] References Cited

U.S. PATENT DOCUMENTS

| | | | |
|---|---|---|---|
| 4,763,270 | 8/1988 | Itoh et al. | 364/449 |
| 4,792,907 | 12/1988 | Ikeda et al. | 364/449 |
| 4,796,191 | 1/1989 | Honey et al. | 364/450 |
| 4,890,104 | 12/1989 | Takanabe et al. | 340/995 |

Primary Examiner—Thomas G. Black
Attorney, Agent, or Firm—Price, Heneveld, Cooper, DeWitt & Litton

[57] ABSTRACT

Disclosed is a navigation apparatus for showing a driver the current position of his vehicle by estimating the vehicle position on the basis of the travel direction and travel distance thereof and matching the current vehicle position thus estimated to map information stored previously. The apparatus disclosed is capable of navigating a vehicle with accuracy even if it is traveling on a road which is not stored in memory; in that case, the apparatus repeats comparison of the vehicle travel direction with the directions in which lie the current vehicle position and respective nodes stored in memory, and accumulates the comparison results so as to infer the arrival of the vehicle at its destination which corresponds to one of the nodes stored in memory.

14 Claims, 19 Drawing Sheets

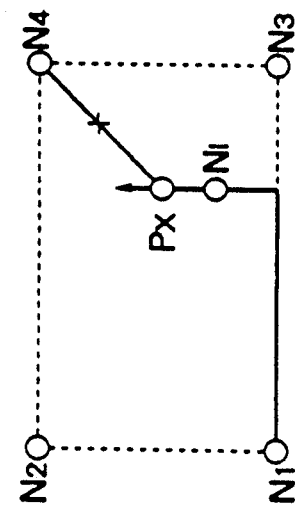
FIG IIA
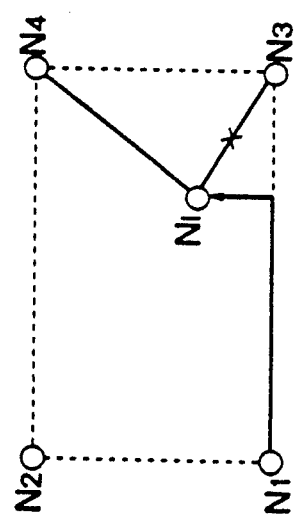
FIG IIB
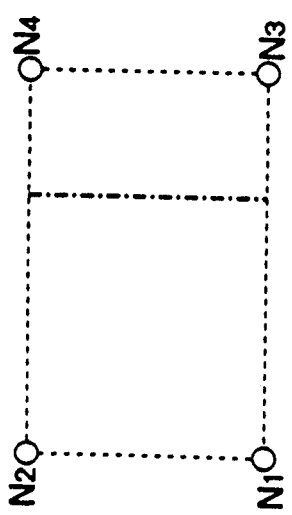
FIG IIC
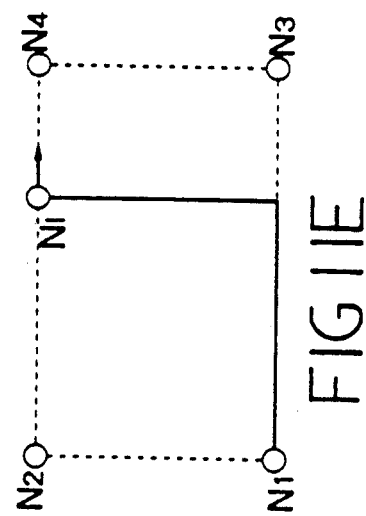
FIG IIE
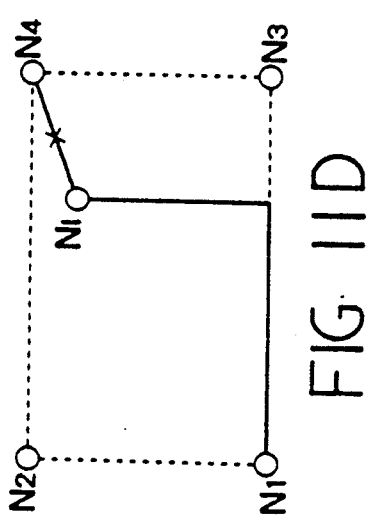
FIG IID

NODE INFORMATION

| NODE | LINK | WEIGHT |
|------|------|--------|
| ⋮ | ⋮ | ⋮ |

APPARATUS FOR NAVIGATING VEHICLE

BACKGROUND OF THE INVENTION

1. Related Applications

The present disclosure is directly or indirectly related to the following U.S. and Japanese applications:

A U.S. patent application titled "Apparatus for Navigating Vehicle" (filed in the United States on Apr. 25, 1989, Ser. No. 07/342,951); and Japanese Patent Applications (on which this U.S. application is based) No. 63-106556 (filed in Japan on Apr. 28, 1988), 63-108175 (filed in Japan on Apr. 30, 1988), and 63-1087176 (filed in Japan on Apr. 30, 1988).

2. Field of the Invention

This invention relates to a navigation apparatus, and, more specifically, to a vehicle navigation apparatus of the type which helps to guide a vehicle while matching the current vehicle position conjectured by the dead-reckoning method with the road as depicted on a map stored previously.

3. Description of the Prior Art

Recently, a dead-reckoning method has come to be used in the field of vehicle navigation. According to this method, a current vehicle position is conjectured on the basis of information on the vehicle travel direction obtained by utilizing geomagnetism and the integrated travel distance. In navigating a vehicle by this dead reckoning method, the current vehicle position conjectured by the method is displayed on a display screen along with a map representing the area around the position. It is said to be a problem with this method that it can involve accumulation of measurement errors.

Various attempts have been made to overcome this problem. For example, there is a method available which is called map matching. As described in Japanese Patent Laid-Open No. 61-209316, this map matching method consists in correcting the conjectured current vehicle position to a position on a road map which exhibits a peculiar road configuration, such as an intersection, at the time when the vehicle is judged to have passed that position (The operation is referred to as map matching).

It is to be noted, however, that, after all, this map matching method is also based on the dead-reckoning method. Furthermore, peculiar points such as intersections cannot always be expected to exist. It can happen that two adjacent peculiar points are separated from each other by such a distance that measurement errors accumulate in the interval from one to the other to an excessive degree, so that map matching cannot be conducted any more due to the accumulated measurement errors. Attempting to perform map matching in such cases may result in the current position being erroneously map-matched onto a road other than the one on which the vehicle is actually running. Once the current vehicle position has been map-matched onto the wrong road, it is impossible to effect correct map matching thereafter.

In view of this, the inventors of the present invention developed a map-matching method in which map matching can be reliably conducted without depending on such unreliable points as intersections, which cannot always be expected to exist, and then filed patent applications for the method in the name of the assignee (e.g., the U.S. patent application titled "Apparatus for Navigating Vehicle", filed on Apr. 25, 1989, Ser. No. 07/342,951, and Japanese Patent Application No. 63-106556). This method comprises a combination of the dead-reckoning and map-matching methods, and further employs a plurality of nodes which are arranged along the roads on a map and used as data. Coordinate positional information is assigned to each of these nodes. Furthermore, a link relationship is established to relate each node to the others which are connected thereto through roads. Once such a link relationship has been established, it is logically impossible for a vehicle to start from one node and reach another which is not linked therewith. The peculiar points including intersections as mentioned in Japanese Patent Laid-Open No. 61-209316 may be regarded as "nodes" which are not link-related to each other.

In accordance with the disclosures of Japanese Patent Application No. 63-106556, etc., a multitude of such nodes are provided, which allows map matching to be conducted periodically, thereby making it possible to effect map matching before vehicle position measurement errors have accumulated to an excessive degree. Accordingly, there is no danger of a vehicle position being corrected to the wrong road. In the following description, roads which are previously stored in memory in terms of an inter-node link relationship will be referred to as "memory roads".

However, to enable periodical map matching using nodes provided along roads as in Japanese Patent Application No. 63-106556, it will be necessary to provide nodes for all the roads in the area concerned that are open to vehicles, including tiny back alleys. This, however, is impossible because of the limited capacity of the memory means (e.g., CD-ROM) for storing road information and the high cost involved. In view of this, it might be possible to prepare nodes for only those roads on which the vehicle is likely to be found traveling relatively often, and eliminating nodes for smaller roads. If, in that case, the vehicle travels on a road to which no nodes are allocated, it is to be regarded as "non-memory road travel" which allows no map matching. Attempting to perform map matching in such cases will result in the vehicle position being erroneously map-matched onto a memory road, which means that the vehicle position as displayed on the navigation apparatus is in disagreement with the road on which the vehicle is actually running. Japanese Patent Laid-Open No. 61-209316 takes no account of such non-memory road travel.

Japanese Patent Application No. 63-106556, mentioned above, solved this problem by developing a control method comprising a procedure for finding a target node when the vehicle concerned is considered to be traveling on a memory road, a procedure for making a judgment as to whether the vehicle is traveling on a road which is not stored in memory (hereinafter referred to as a "non-memory road"), a procedure for finding a target node when the vehicle is traveling on a non-memory road, and a procedure for making a judgment as to whether or not the vehicle has been restored to a memory road. When, as shown in FIG. 1, the vehicle is judged to be traveling on a non-memory road, the distance Lx between the point (referred to as Px) at which it is considered to have deviated from a memory road and the current position (referred to as Po) conjectured by the dead-reckoning method, is calculated, the target node being searched for on the basis of this distance. The term "target node" represents here a single node that is to be specified from among the nodes which are within a circle having the point Px as its center and a radius r that is expressed as:

$$r = Lx \times \beta.$$

Such nodes will be hereinafter referred to as "candidate nodes". In searching for the target node, the distance Lx' from the current position Px to each candidate node is calculated. When the distance Lx' from the current vehicle position to a candidate node is less than a certain threshold H, i.e., $$Lx' < H,$$

that candidate node is regarded as the node to be reached. In FIG. 1, the solid line represents a memory road, and the dashed line a non-memory road.

Thus, in accordance with this method, the target node is specified, when the vehicle is running on a non-memory road, from among candidate nodes that can be reached, on the basis of the distances Lx' between the current position and the respective candidate nodes. As will be understood, this method simply depends on the comparison of the respective distances Lx' and the threshold H, resulting in rather low accuracy in specifying the target node. Accordingly, it can happen that the wrong node is specified as the target node to be reached when the vehicle is restored to a memory road, which makes it impossible to continue dead reckoning and map mapping thereafter.

SUMMARY OF THE INVENTION

The present invention has been contrived with a view to eliminating the above-mentioned problems experienced with the prior art and the prior applications. It is accordingly an object of this invention to provide a vehicle navigating apparatus in which the storage capacity for map matching data is reduced, thereby making it possible, while admitting the existence of non-memory roads, to improve the accuracy in specifying the point on a memory road to which a vehicle, traveling on a non-memory road, is to be restored. This invention further aims at providing a vehicle navigation apparatus which allows the map-matching travel to be reliably continued after the vehicle has been restored to a memory road.

In accordance with this invention, there is provided a navigation apparatus, comprising: a conjecture means for conjecturing the current position of a vehicle by the dead reckoning method on the basis of the vehicle travel direction and vehicle travel distance, a node storage means for storing road information in the form of the positions of a plurality of nodes provided on the roads concerned, a non-memory road judging means for making a judgment as to whether or not the road on which the vehicle is running is one which is stored in the above-mentioned storage means, and a target node specifying means for specifying, when the vehicle is judged by the above-mentioned non memory road judging means to be traveling on a road which is not stored in the above-mentioned node storage means, the node to be reached when the vehicle is restored to a memory road, on the basis of the respective directions in which lie the current position conjectured by the above-mentioned conjecture means and the nodes stored in the above-mentioned node storage means, as well as on the basis of the vehicle travel direction.

Thus, the navigation apparatus of this invention admits the existence of non-memory roads, thus making it possible to reduce the storage capacity for the node information. At the same time, the apparatus continues, while the vehicle is traveling on a non-memory road, to conjecture the destination node on the basis of the respective directions in which lie the current position and the nodes stored in memory and of the vehicle travel direction, so that any point on a memory road to which the vehicle is restored can be specified more accurately.

In one form of the navigation apparatus in accordance with this invention, the node storage means further stores the connective relationship between the nodes, and the non-memory road judging means includes a first candidate node extracting means for extracting from the node storage means a plurality of nodes connected to a start node as target candidate nodes, a first node deleting means for identifying from among the candidate nodes those nodes which cannot be the target node by comparing the respective directions in which the current vehicle position and these candidate nodes lie with the vehicle travel direction and for deleting the nodes thus identified from the candidate nodes, and a determining means for judging the vehicle to be running on a non-memory road when the number of candidate nodes has been reduced to zero as a result of the node deletion effected by the above-mentioned first node deleting means.

In accordance with this form, those nodes which are not likely to be the target node are deleted through elimination, while the vehicle is running on a memory road, from the candidate nodes, thereby making it possible to make a correct judgment as to whether or not the vehicle is running on a non-memory road.

In accordance with another form of the navigation apparatus of this invention, the node storage means further stores the connective relationship between the nodes, and the target node specifying means includes a search area setting means for setting the search area corresponding to the travel distance covered by the vehicle from the time when the vehicle is judged to be running on a non-memory road to the present, a second candidate node extracting means for extracting a plurality of nodes existing within this search area as target candidate nodes, and a second node deleting means for narrowing down the candidate node choice range by identifying, from among the candidate nodes, those nodes which cannot be the target node on the basis of the respective directions in which lie the current position and the respective candidate nodes and of the vehicle travel direction and by deleting the nodes thus identified from the candidate nodes.

In accordance with this form of apparatus, the connective relationship between the nodes cannot be utilized in narrowing down the candidate node choice range while the vehicle is running on a non-memory road, so that a search area for the candidate nodes is set, and the nodes within this search area are extracted as target candidate nodes. That node which is closest to the destination is gradually specified through elimination from among these candidate nodes.

In a navigation apparatus in accordance with still another form of this invention, the above-mentioned search area consists of a circle having a radius which is in proportion to the total travel distance covered by the vehicle from the time when the vehicle is judged to be running on a non-memory road to the present.

In a navigation apparatus in accordance with a further form of this invention, the radius of the above-mentioned circle corresponds to a value obtained by multiplying by a constant which is one or less the travel distance covered by the vehicle from the time at which it is judged to be running on a non-memory road to the present.

In a navigation apparatus in accordance with a still further form of this invention, an upper and a lower limit are established to the radius of the above-mentioned circle. With this arrangement, the search area is not set excessively small or wide, thereby improving the accuracy in extracting the target candidate nodes.

In a navigation apparatus in accordance with a still further form of this invention, the target node specifying means includes an average travel direction storage means for storing the average of the travel directions for the respective travel distance units covered, and an angle difference calculating means for calculating, when the vehicle is judged by the non-memory road judging means to be running on a non-memory road, the average value, for the respective candidate nodes, of the angle differences between the data on the directions in which lie the current vehicle position and these candidate nodes and the stored data on a plurality of average travel directions for the respective travel distance units, the above-mentioned second deleting means deleting from the candidate nodes those nodes which involve an angle difference exceeding a first predetermined value.

In accordance with this form of apparatus, the target node search when the vehicle is running on a non-memory road is performed through elimination taking into account the travel process in the past.

In a still further form of the navigation apparatus in accordance with this invention, the above-mentioned target node specifying means includes a control means for operating the above-mentioned search area specifying means and the second candidate node extracting means, the average of the angle differences of any new candidates detected by the second candidate node extracting means when a new search area is set by the above-mentioned search area specifying means being calculated by the above-mentioned angle distance calculating means using the average travel direction data stored in memory after the time when these new candidate nodes are detected.

In accordance with this form of apparatus, the judgment as to whether or not a new candidate node found during the target node search when the vehicle is traveling on a non-memory road is a target node, is made using the travel distance data stored in memory after the time when that new candidate node is detected, so that the evaluation of that new candidate node is not affected by the travel process in the past. This form of apparatus is effective when the non-memory road concerned is actually curved to a large degree.

In a still further form of the navigation apparatus in accordance with this invention, the target node specifying means has a map-matching means for map-matching the current vehicle position onto a specified node.

In a still further form of the navigation apparatus in accordance with this invention, the above-mentioned map-matching means performs map matching when the distance between the node specified by the target node specifying means and the current vehicle position is not larger than a second predetermined value.

In a still further form of the navigation apparatus in accordance with this invention, the apparatus is further equipped with a means for judging the vehicle to have been restored to a memory road when a node is specified by the above-mentioned target node specifying means.

BRIEF DESCRIPTION OF THE DRAWINGS

FIGS. 11$a$ to 11$e$ schematically illustrate the control operation performed when the vehicle is restored from a non-memory road to a memory road point which is not a node;

DESCRIPTION OF THE PREFERRED EMBODIMENT

A preferred embodiment of this invention will now be described with reference to the accompanying drawings.

CONSTRUCTION OF THE EMBODIMENT APPARATUS

Figure 1:
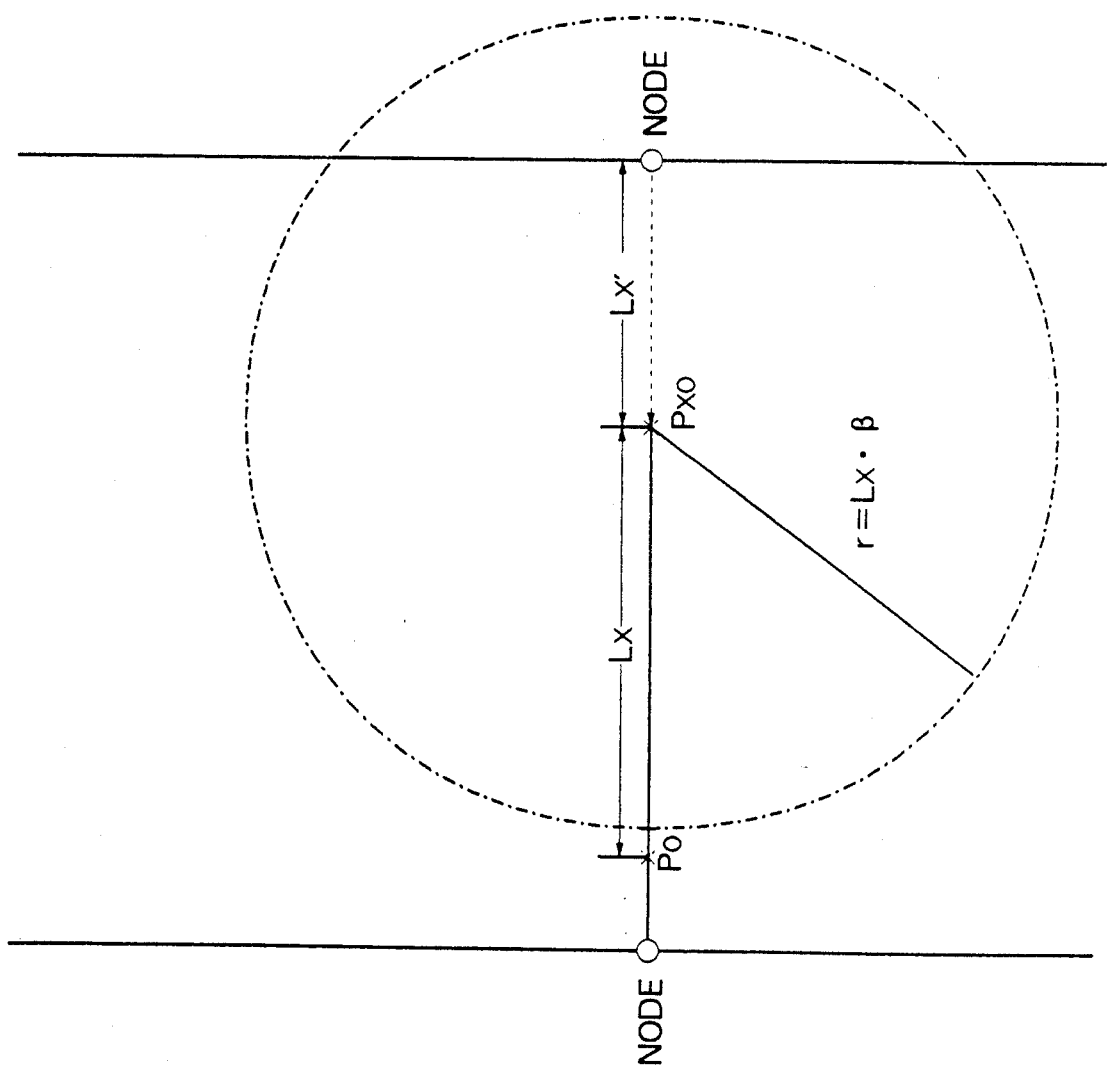
FIG. 1 illustrates the principle of the target node search to be performed when the vehicle is running on a non-memory road in the navigation apparatus of a prior invention by the inventors of the present invention.
Figure 2:
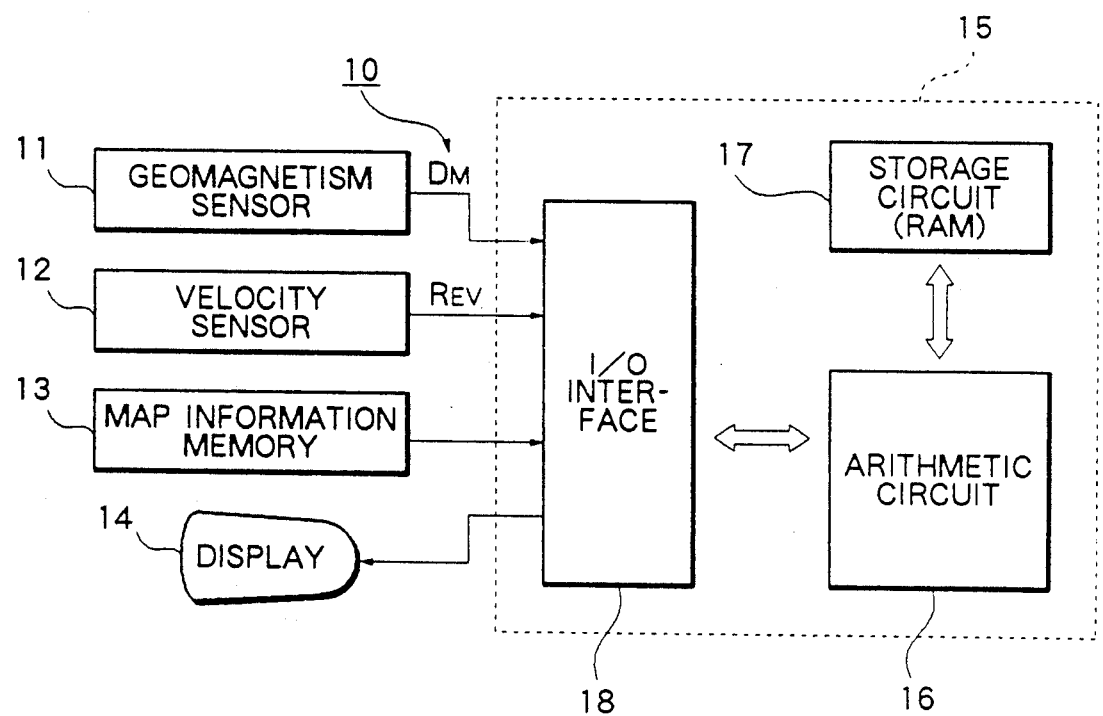
FIG. 2 shows the construction of the navigation apparatus in accordance with an embodiment of this invention.

FIG. 2 shows a control system configuration of a vehicle navigation apparatus in accordance with this embodiment. This navigation apparatus 11 comprises a geomagnetism sensor 10 for detecting the travel direction ($D_M$) of the vehicle, a vehicle velocity sensor 12 adapted to output a pulse signal $R_{EV}$ for each rotation of the wheels, a map information storage device 13 storing map information including graphic image data such as a map representing geographical information on roads and buildings and node information on nodes allocated to the roads and buildings, a display 14 consisting of a CRT, etc. and adapted to display road information as the geographical information stored in the above-mentioned map information memory 13, and a control circuit 15 for controlling these.

This control circuit 15 includes an arithmetic circuit 16, a storage circuit 17 connected thereto, and an I/O interface 18, the geomagnetism sensor 11, the vehicle velocity sensor 12, the map information memory 13 and the display 14 being connected to the above-mentioned arithmetic circuit 16 through the I/0 interface 18. Thus, a signal indicative of the vehicle travel direction transmitted from the geomagnetism sensor 11 and a signal indicative of the vehicle travel distance transmitted from the vehicle velocity sensor 12 are input through the I/0 interface 18 to the arithmetic circuit 16. The estimated current vehicle position is then calculated in the arithmetic circuit 16, the result of the calculation being temporarily stored in the storage circuit (RAM) 17. On the other hand, the control circuit 15 extracts beforehand the graphic image of the map representing the area concerned and the node information from the map information memory 13. Map matching is periodically conducted; when no map matching is conducted, the display 14 represents oh its screen the conjectured vehicle current position detected in the manner described above. When map matching is conducted, it represents the corresponding estimated current vehicle position matched onto the map. The map information memory 13 may consist, for example, of a CD-ROM and a CD drive (player) for CD-ROM reproduction.

As map information to be stored in the above-described map information memory 13, a multitude of nodes are provided for the roads, the respective positions of the nodes being previously stored in memory along with data showing the connective relationship between the nodes. These nodes are provided not only at intersections, corners, etc., but also on straight roads at predetermined intervals.

NODES

Figure 3A:
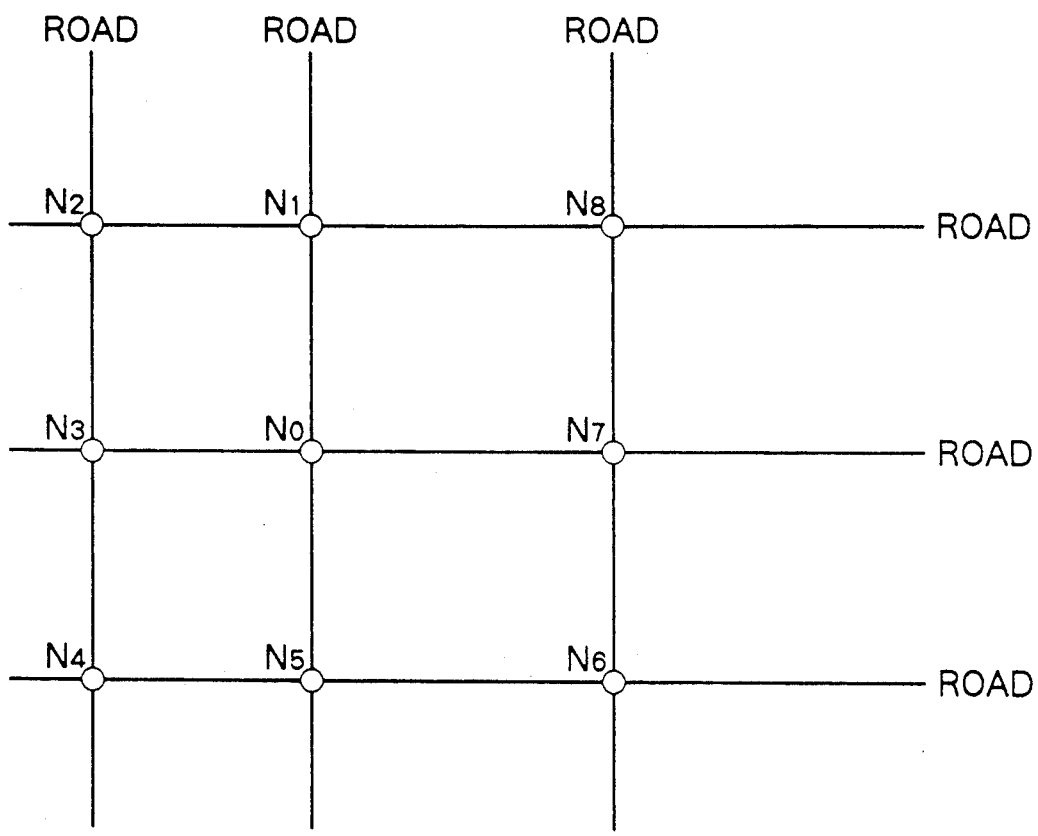
FIGS. 3A and 3B illustrate the relationship between the nodes and the roads as well as the connective relationship between the nodes.
Figure 3B:
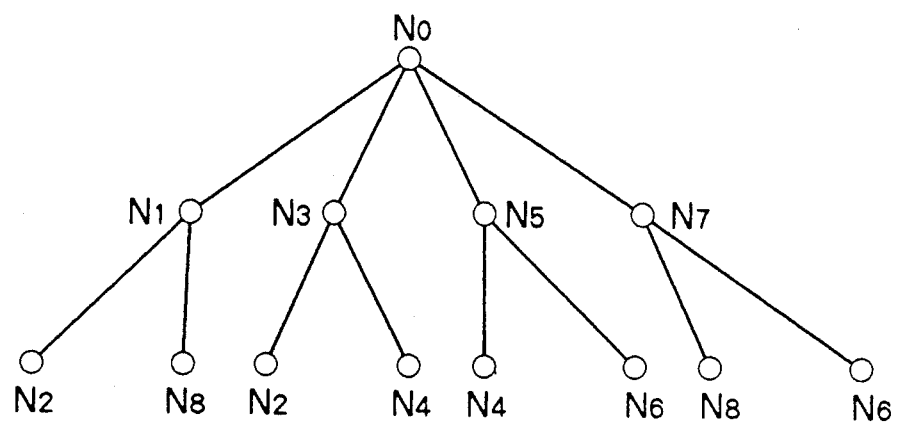

FIGS. 3A and 3B show the relationship between the roads and the nodes arranged thereon. FIG. 3A shows, by way of example, a lattice-like road arrangement, nodes $N_0$ to $N_8$ being provided at the intersection of these roads. As described above, the map information memory 13 stores the positional coordinates of these nodes as well as the connective relationship for each node showing how it is connected to the others. This relationship is represented, in the case of node $N_0$ in FIG. 3A, as links between this node $N_0$ and those nodes which are directly connected thereto (i.e., primary connection). FIG. 3B shows the connective relationship as seen from the node $N_0$.

DATA USED FOR THE APPARATUS CONTROL

Figure 4:
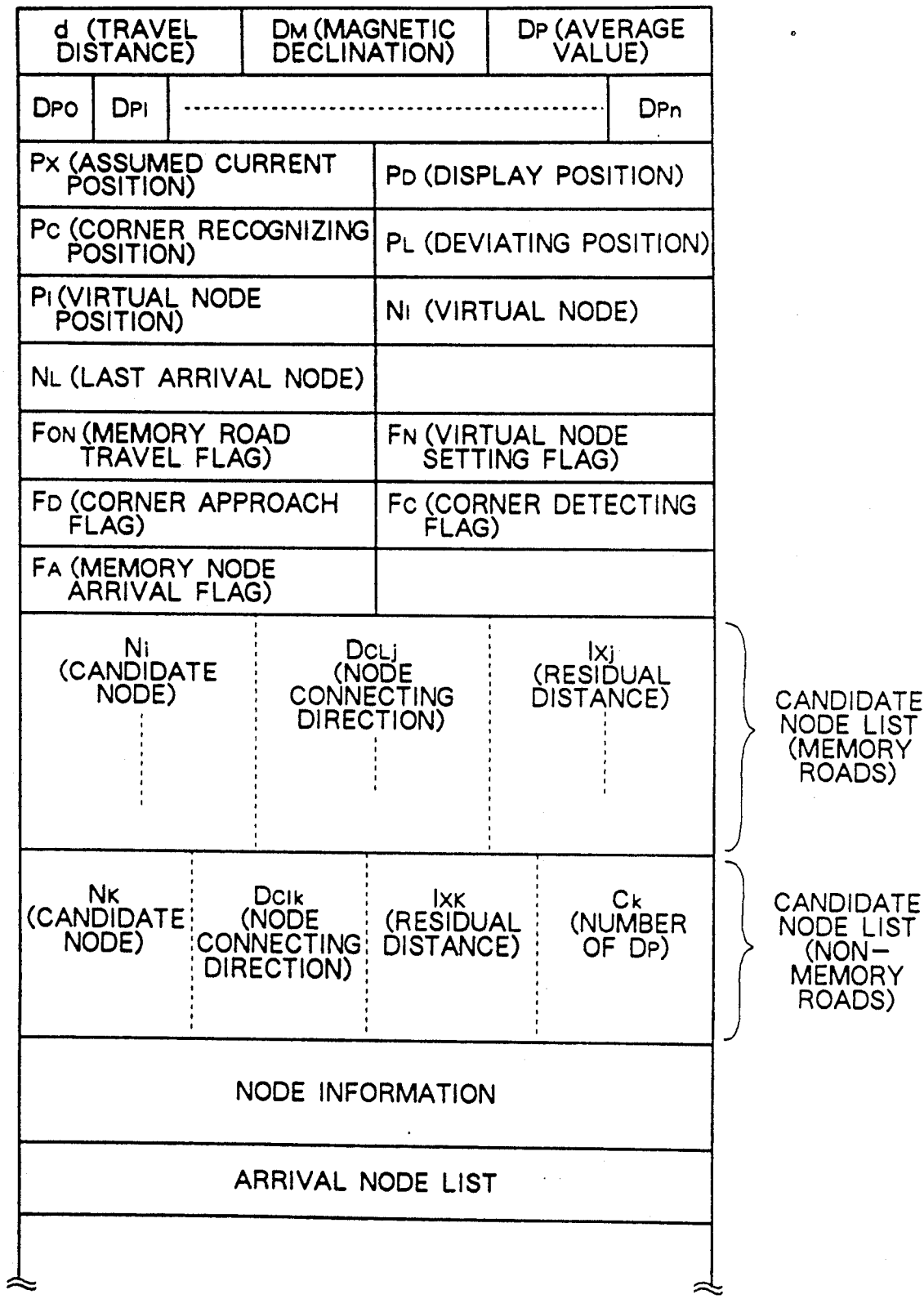
FIG. 4 illustrates how the flags, etc. used for control are stored in the RAM.

FIG. 4 shows how the flags, intermediate data, etc. used for controlling the apparatus of this embodiment are stored in the RAM. These data will now be briefly described.

Stored in the section d is the travel distance covered by the vehicle running by the dead-reckoning method. The character $D_M$ represents the magnetic declination of the geomagnetism currently read. Stored in $D_P$ is the average of the geomagnetism values that have been read. The values $D_{PO}, D_{P1}, —D_{Pi}, —D_{Pn}$ constitute an array of the geomagnetism values $D_P$ successively stored in memory as the vehicle moves along. In this embodiment, the geomagnetism $D_M$ is measured 32 times to obtain the average of the $D_P$ values $$D_P = \frac{\Sigma D_M}{32} \quad (1)$$

$P_X$ indicates the assumed current vehicle position calculated by the dead-reckoning method, and $P_D$ the display vehicle position to be displayed on the display 14. $P_C$ indicates a position where a corner passed by the vehicle is recognized as such. $P_L$ denotes a position where the vehicle is judged to have deviated from a memory road, and $P_I$ a position where a virtual node, which is described below, is set. The section $N_I$ stores the ID number of the virtual node, and the character $N_L$ represents the ID number of the node reached by the vehicle last.

$F_{ON}$ represents the flag for storing the results of the judgments as to whether the vehicle is running on a memory road ($F_{ON}=1$) or not ($F_{ON}32\ 0$). $F_N$ represents the flag for indicating that a virtual node is being set, and $F_C$ is the corner detecting flag; each time the vehicle passes a corner on the road, this is detected and recorded by the flag $F_C$. The character $F_D$ and $F_A$ indicate the corner approach flag and the node arrival flag; each time the vehicle approaches a corner or arrives at a node, this is detected and recorded by the flag $F_D$ or $F_A$.

$N_j$, $D_{CLj}$ and $I_{Xj}$ form an array of candidate nodes when the vehicle is running on a memory road, each element being retrieved by the index j. $N_j$ represents the respective names of the candidate nodes, $D_{CLj}$ the direction toward the j-th node as counted from the node the vehicle has reached last, and $I_{Xj}$ the residual distance between the current vehicle position $P_X$ and the j-th candidate node.

$N_k$, $D_{cIk}$ and $I_{Xk}$ form a list of candidate nodes when the vehicle is running on a non-memory road, each element being retrieved by the index k. $N_k$ represents the respective ID numbers of the candidate nodes, $D_{CIk}$ the data on the direction in which virtual node and the k-th node lie, and $I_{Kk}$ the residual distance between the current vehicle position $P_X$ and the k-th candidate node. The character $C_k$ indicates the number of $D_P$ used for evaluating the respective candidate nodes.

CONTROL PROCEDURES

Main Routine

Figure 5A:
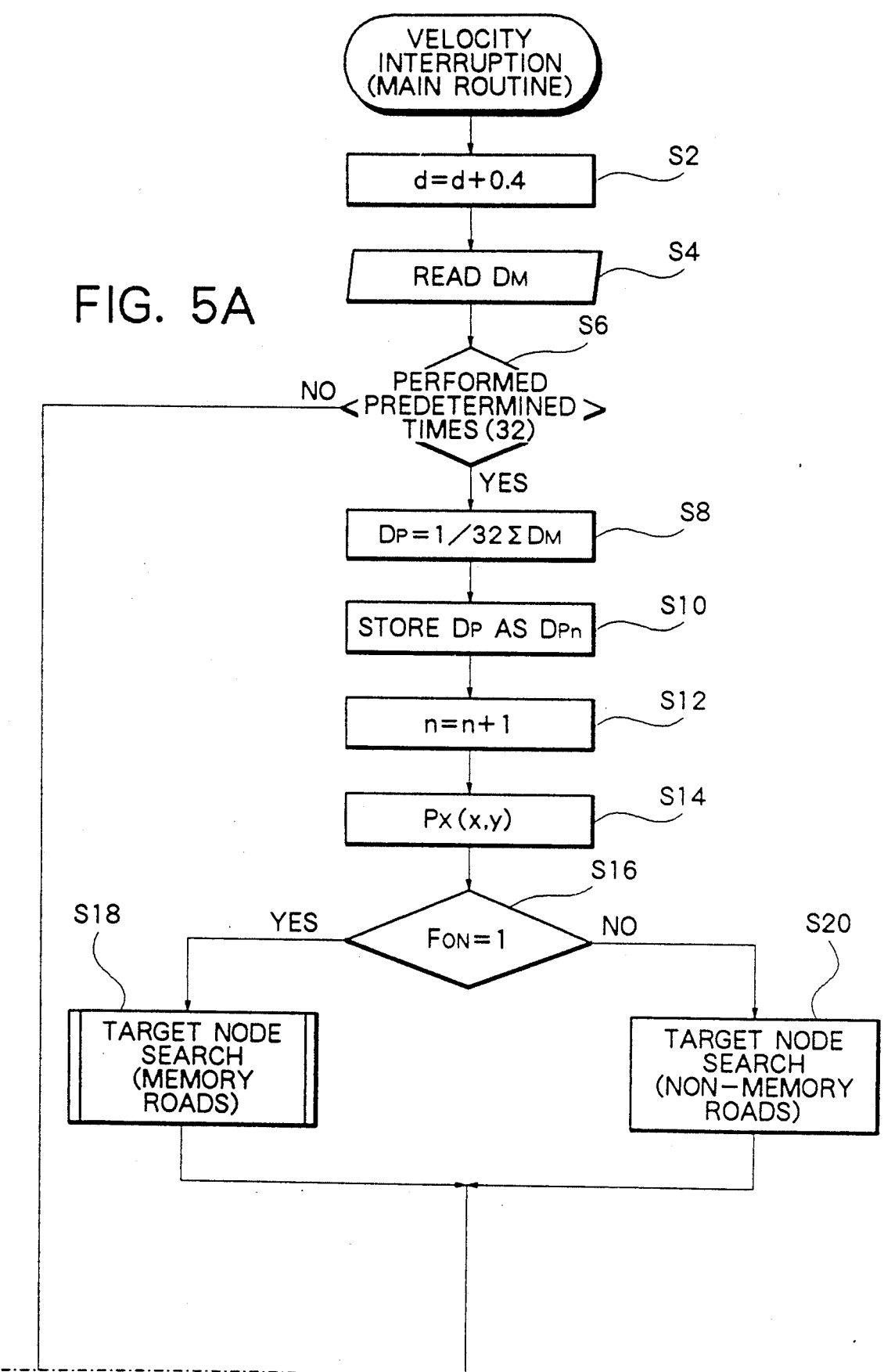
FIGS. 5A and 5B are flowcharts illustrating the main routine of a control program in accordance with an embodiment of this invention.
Figure 5B:
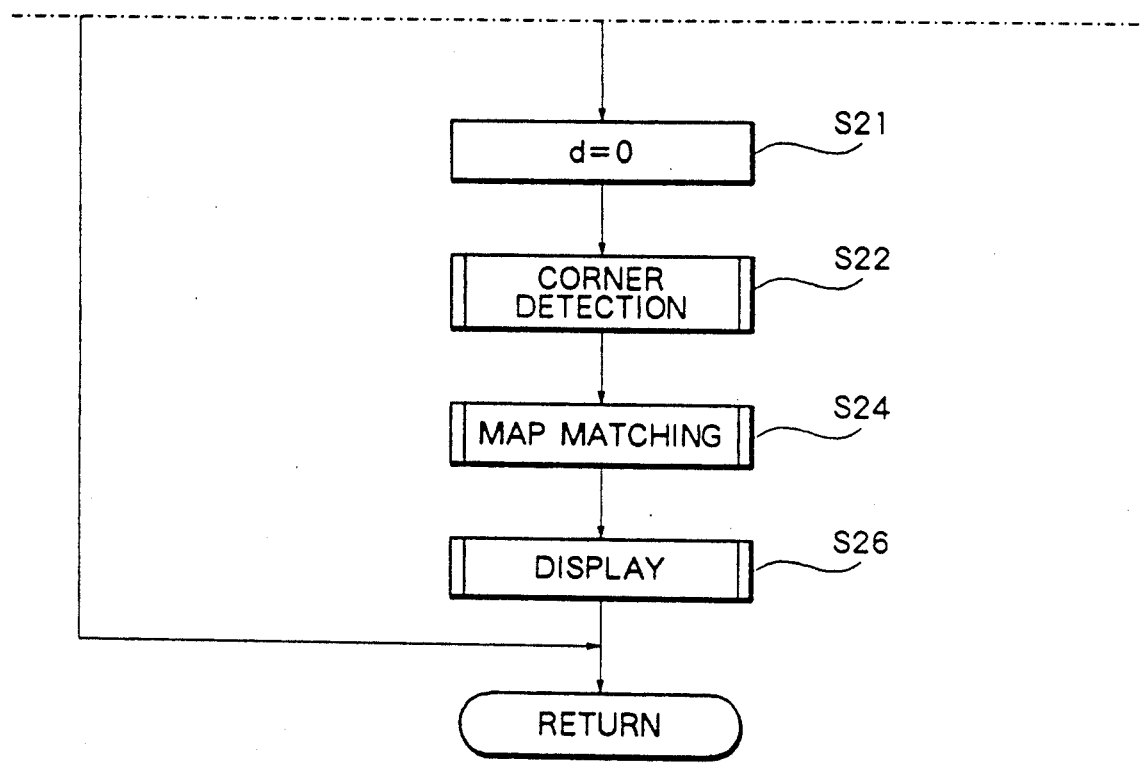
Figure 6A:
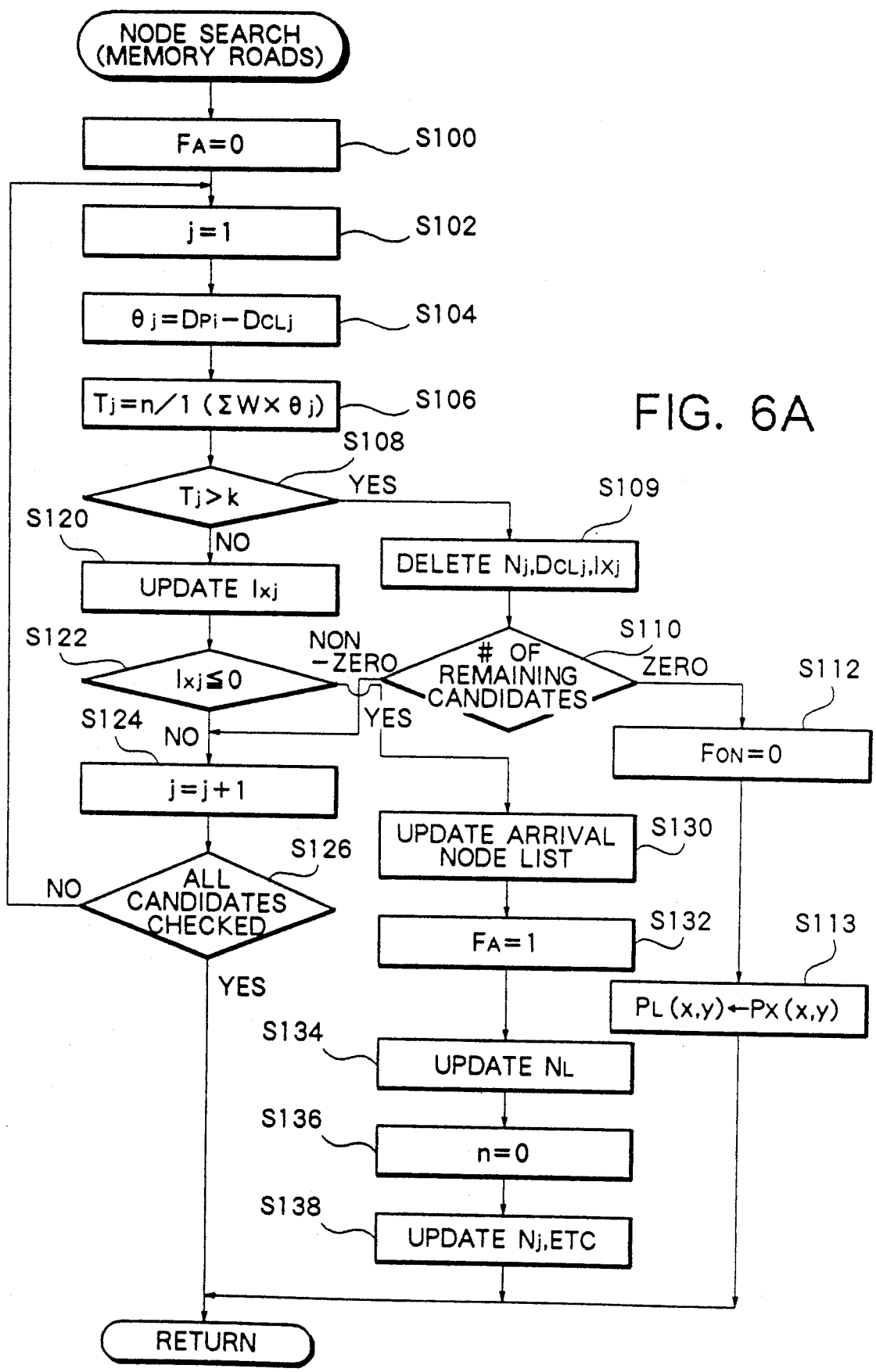
FIG. 6A is a flowchart illustrating the subroutine of the node search control to be performed when the vehicle is running on a memory road.
Figure 6B:
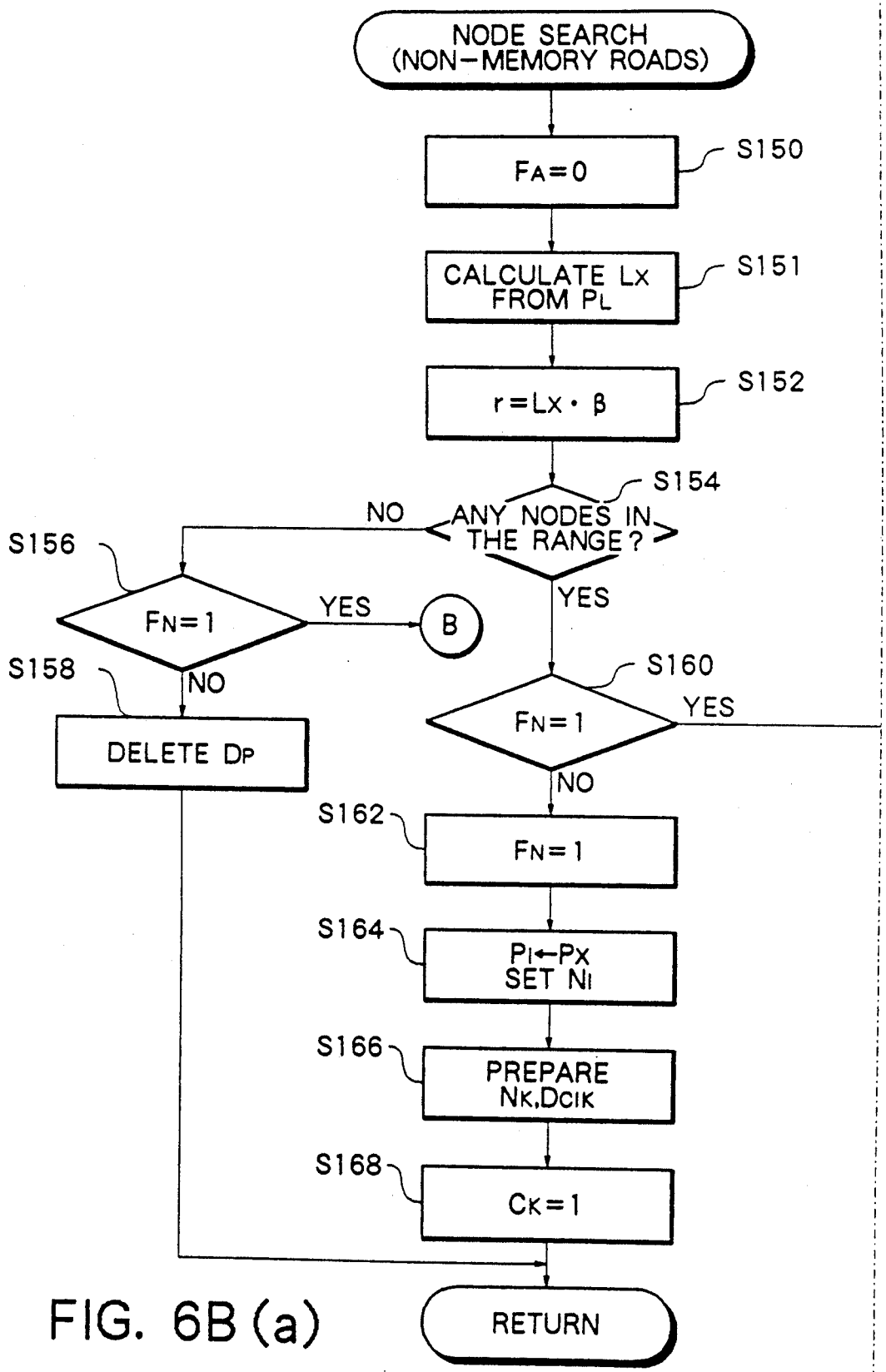
FIGS. 6B($a$), 6B($b$) and 6C are flowcharts illustrating the subroutines of the node search control to be performed when the vehicle is running on a non-memory road.
Figure 6B:
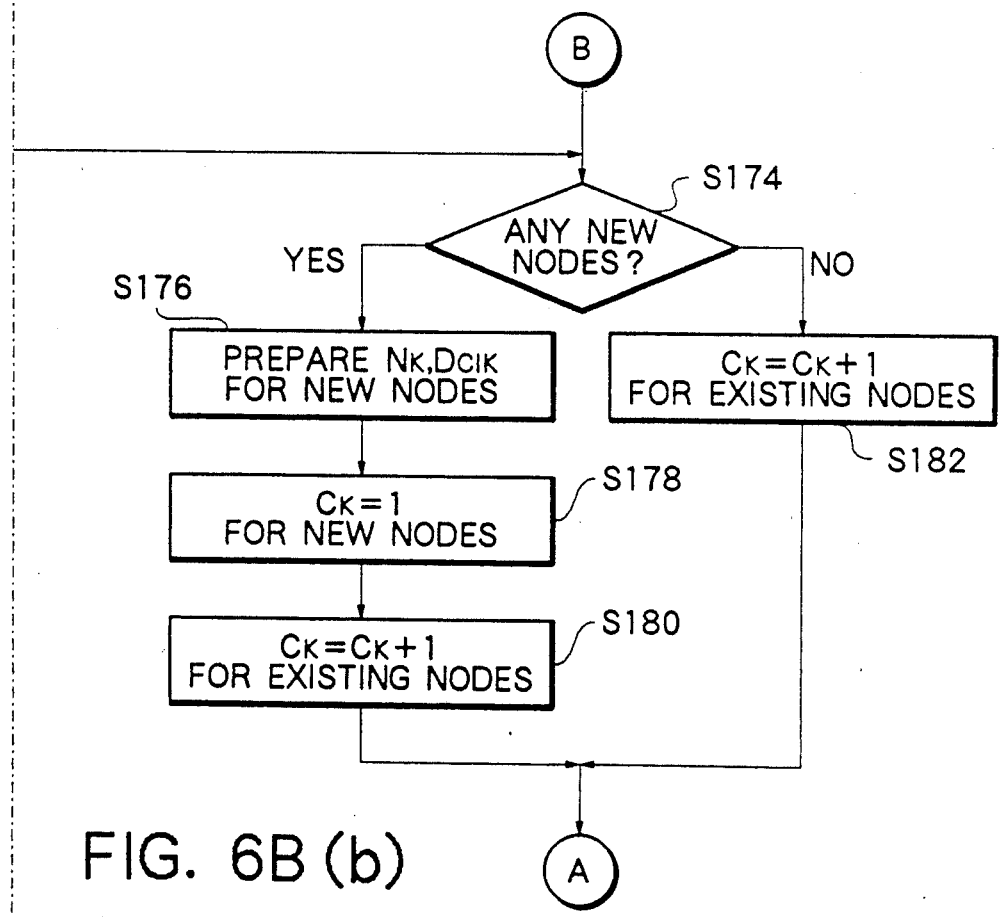
Figure 6C:
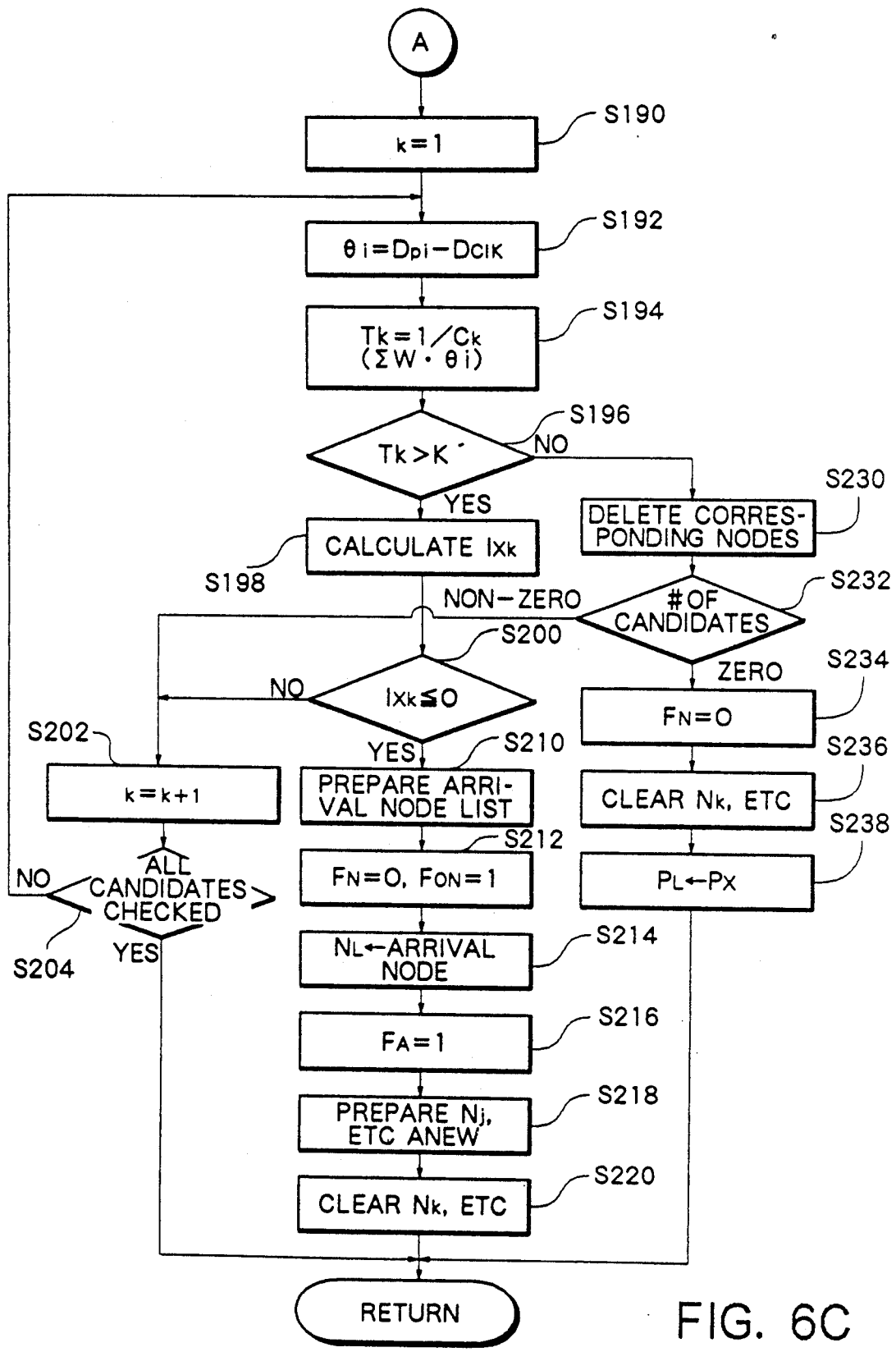
FIG. 6D is a flowchart illustrating the corner detection control.
FIG. 6E is a flowchart illustrating the map-matching control.
Figure 6D:
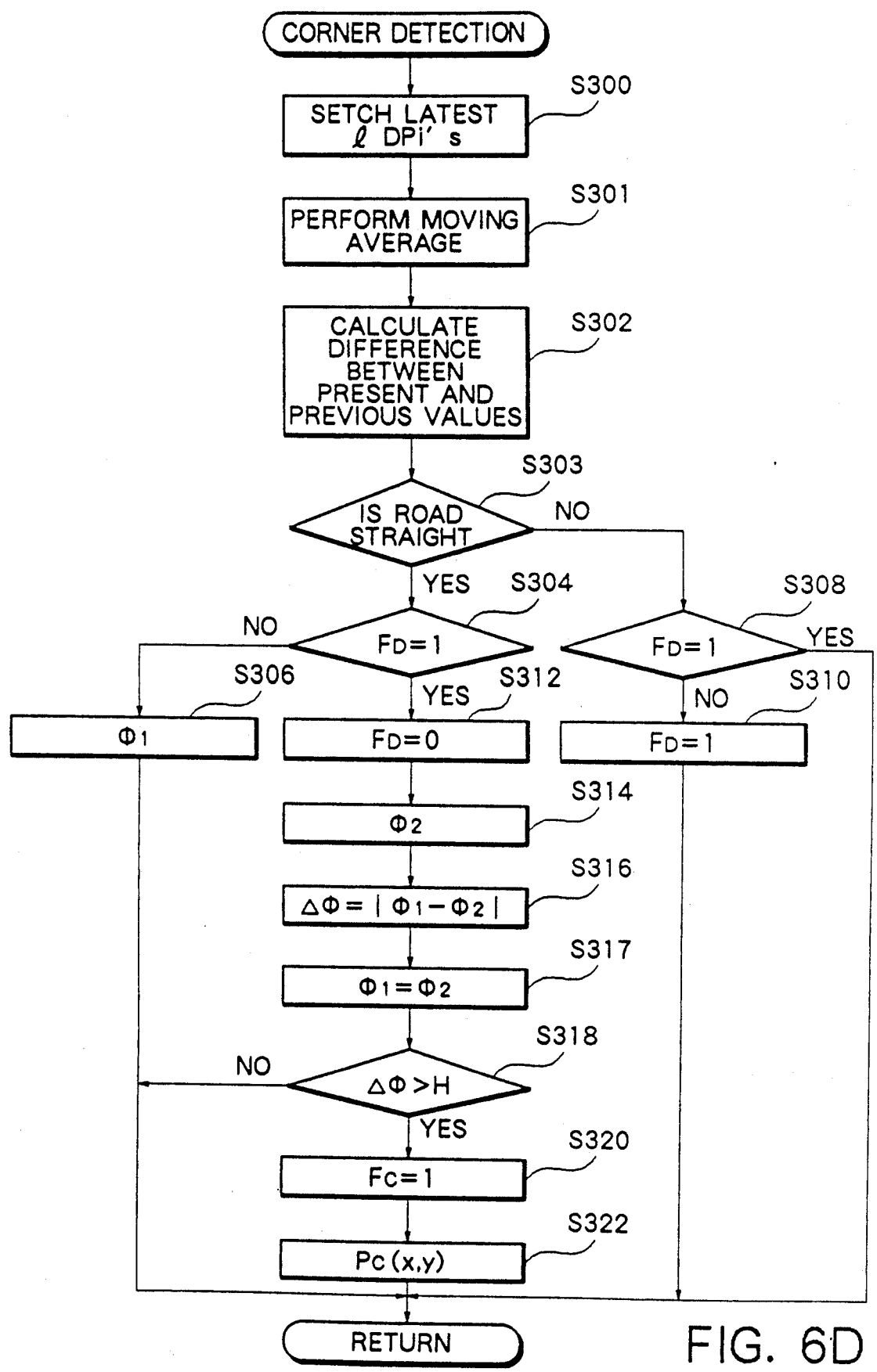
Figure 6E:
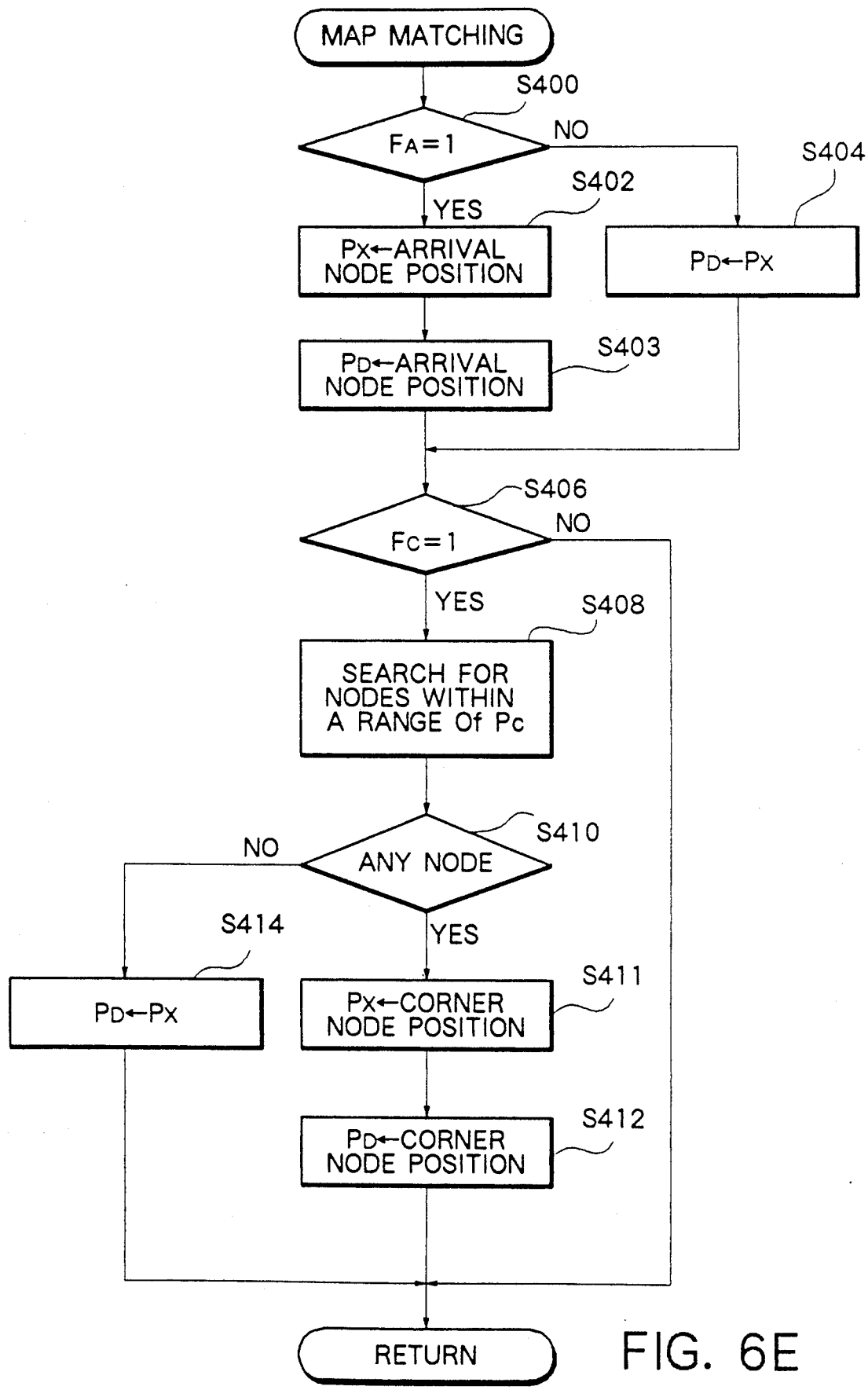

FIG. 5 is a flowchart showing the process of navigation control in its entirety. FIG. 6A is a program flowchart for the node search control when the vehicle is traveling on a memory road ($F_{ON}=1$), and FIGS. 6B and 6C are program flowcharts for the node search when the vehicle is traveling on a non-memory road; FIG. 6D is a program flowchart for the corner detection control, and FIG. 6E is a program flowchart for the map-matching control.

First, the entire process of the navigation control will be described with reference to FIG. 5. The program of FIG. 5 is an interrupt routine started each time an $R_{EV}$ pulse from the vehicle sensor 12 is input.

In Step S2, the vehicle travel distance d is updated. The pulse $R_{EV}$ is generated for each rotation of the wheels. In this embodiment, one rotation of the wheels causes the vehicle to advance 0.4 m. Accordingly, $$d = d + 0.4 \tag{2}$$

In Step S4, the magnetic declination $D_M$ is read by means of the geomagnetism sensor 11. It is examined in Step S6 to see whether the operations of Steps S2 and S4 have been conducted 32 times. If the result in Step S6 is negative, the target node search is not conducted, the procedure returning from Step S6 to the main routine.

When the number of magnetic declination values $D_M$ collected has become 32, the procedure moves on to Step S8, where the average $D_P$ of the 32 magnetic declination values $D_M$ is obtained. As stated above, this magnetic declination average $D_P$ is to be expressed as:

$$D_P = \frac{\Sigma D_M}{32}$$

Since the vehicle advances 40 cm for each $R_{EV}$ interruption, it advances 12.8 m when the interruption is repeated 32 times. In other words, the control procedures of Step S8 and thereafter are started each time the vehicle advances 12.8 m. The number of times is not limited to 32; it can be changed in accordance with the wheel size.

In Step S10, the $D_P$ obtained in Step S8 is stored in a series of values $D_{Pn}$. This series of values constitutes an array for storing the $D_P$ values calculated for each 12.8 m advancement of the vehicle from the node it reached last to the next one. This array will be explained with reference to FIG. 7. Suppose the average of magnetic declination calculated at the last node is $D_{P0}$, the number of $D_{Pn}$ values increases, as $D_{P1}$, $D_{P2}$,—as the vehicle moves away from the node. The number of $D_P$ values stored is recorded by a counter n, which is incremented in Step S12.

In Step S14, the current vehicle position $P_x$ (x, y) conjectured in accordance with the dead-reckoning method is calculated on the basis of the travel distance d and $D_P$. It is examined in Step S16 to see whether the vehicle is traveling on a memory road from the flag $F_{ON}$.

NODE SEARCH (WHEN THE VEHICLE IS ON A MEMORY ROAD)

The case where the vehicle is traveling on a memory road ($F_{ON}=1$) will be explained first. In the case shown in FIG. 8, node $N_0$ is the node that the vehicle has reached last; the node is directly linked with nodes $N_1$, $N_7$ and $N_5$, the vehicle actually moving toward node $N_7$. Suppose the travel direction data $D_{P0}$ to $D_{P5}$ are calculated before the vehicle have reached the current position $P_X$(x, y). The nodes $N_1$, $N_7$ and $N_5$ can be nominated at the time when the vehicle reaches node $N_0$ on the basis of the stored inter-node connective relationship (see FIG. 3B) which serves to indicate the nodes to which the vehicle can move directly. Such nodes will be referred to as "candidate nodes".

The method of specifying node $N_7$ from among the nodes $N_1$, $N_7$ and $N_5$ which are directly connected to node $N_0$ will be explained.

The connective relationships between nodes $N_0$ and $N_1$, $N_0$ and $N_7$, and $N_0$ and $N_5$ are respectively known beforehand as the connecting directions $D_{C01}$, $D_{C07}$ and $D_{C05}$. In searching for the destination node from among these three candidate nodes, the vehicle travel direction $D_P$ is compared with the inter-node connecting direction $D_C$ with respect to each candidate node, specifying that candidate node which is relatively close to the destination as the destination node. In this embodiment, in particular, this comparison is performed on the basis of an evaluation function $T_j$.

$$T_j = \frac{1}{n} \cdot \sum_{i=0}^{n} W(\theta_i) \cdot \theta_i \tag{3}$$

Here, $$\theta_i = |D_{Pi} - D_{CLj}| \tag{4}$$

where j indicates the j-th candidate node, and $D_{CLj}$ represents the value of the data regarding the direction of the connection between the node $N_L$ at which the vehicle arrived last and the candidate node $N_j$. The above $\Sigma$ is calculated with respect to i on the values of $D_{Pi}$ stored before the vehicle reaches the current position P. The division by n is performed for the purpose of obtaining the average value of the differences between the respective stored travel direction values $D_{P0}$,—$D_{Pn}$ and the respective connecting direction values $D_c$. The smaller the value of this evaluation function $T_j$, the closer the candidate node to the destination node.

Figure 8:
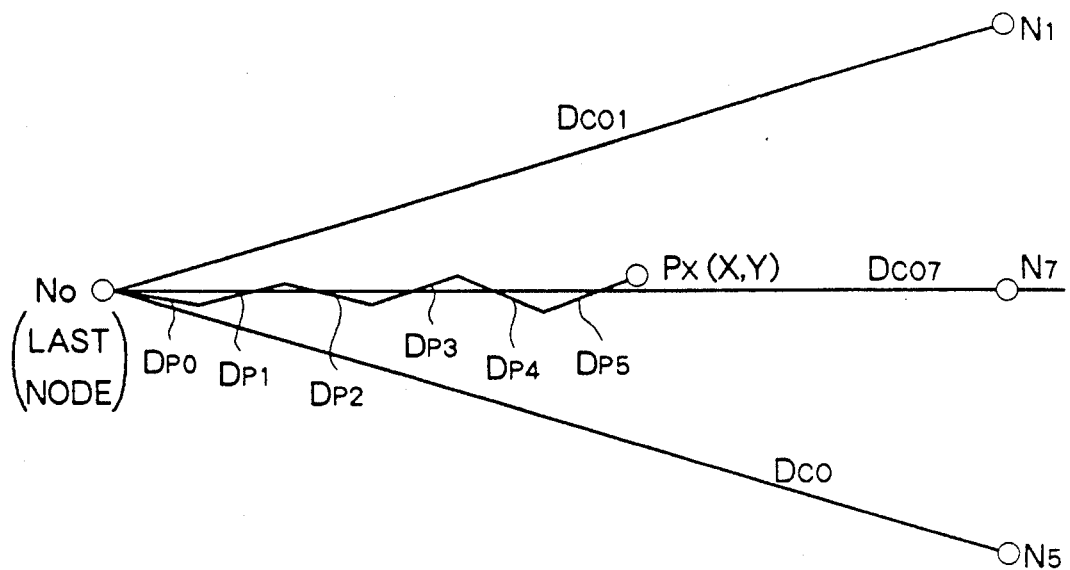
FIG. 8 schematically illustrates the operation of narrowing down the range of node choice when the vehicle is running on a memory road.

This will be shown as applied, for example, to the example of FIG. 8. First, with respect to the candidate node $N_1$, $$\begin{aligned}T_1 = \ & 1/6\{(D_{P0} - D_{C01}) + (D_{P1} - D_{C01}) + (D_{P2} - D_{C01}) + \\ & (D_{P3} - D_{C01}) + (D_{P4} - D_{C01}) + (D_{P5} - D_{C01}) - \\ & (D_{P6} - D_{C01})\}\end{aligned} \tag{5}$$

With respect to the candidate node $N_7$, $$\begin{aligned}T_7 = \ & 1/6\{(D_{P0} - D_{C07}) + (D_{P1} - D_{C07}) + (D_{P2} - D_{C07}) + \\ & (D_{P3} - D_{C07}) + (D_{P4} - D_{C07}) + (D_{P5} - D_{C07}) + \\ & (D_{P6} - D_{C07})\}\end{aligned} \tag{6}$$

With respect to the candidate node $N_5$, $$\begin{aligned}T_5 = \ & 1/6\{(D_{P0} - D_{C05}) + (D_{P1} - D_{C05}) + (D_{P2} - D_{C05}) + \\ & (D_{P3} - D_{C05}) + (D_{P4} - D_{C05}) + (D_{P5} - D_{C05}) + \\ & (D_{P6} - D_{C05})\}\end{aligned} \tag{6}$$

It is examined for each of these candidate nodes to see whether or not the value of the evaluation function T is larger than a predetermined threshold K, thereby judging as to whether or not the node is close to the destination.

Figure 9:
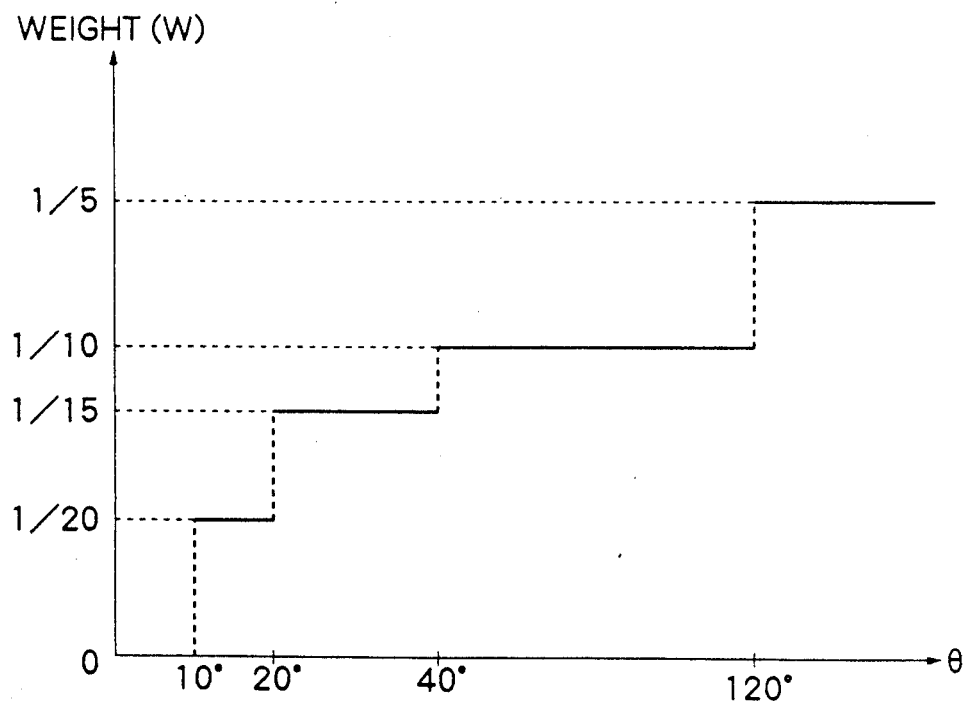
FIG. 9 is a chart showing a characteristic of a weight function W.

This judgment is conducted through elimination. That is to say, if the evaluation value $T_j$ of a node j is larger than the above-mentioned threshold, it is decided that the node is not the destination node, thus narrowing down the range of node choice with a view to specifying the destination node. The above-mentioned weight W exhibits characteristic values as shown in FIG. 9 in accordance with the difference $\theta$ between the connecting direction $D_C$ and the travel direction $D_P$. As shown in FIG. 9, the greater the direction difference θ, the larger the value of the weight W. As will be understood, the greater the direction difference θ of a candidate node, the less likely is the node to be the target node, so that such a node should be deleted from the candidates as soon as possible.

Referring again to the flowchart of FIG. 5, the node search subroutine in Step S18 to be performed when $F_{ON}$ is "1" in Step S16 will be described in detail with reference to FIG. 6A.

First, in Step S100, the arrival flag $F_A$ is set to "0". This flag is set to "1" when the vehicle reaches the next node (Step S132). In Step S102, the index counter j is set to 1. Since this counter j constitutes an index indicative of candidate nodes, the state: j = 1 corresponds to the first one of the candidate nodes.

The loop formed by Steps S104 through S126 via S108 is applicable to each of the candidate nodes nominated by j. Thus, the evaluation function $T_j$ of equation (3) is calculated in Steps S104 and S106 with respect to the j-th node. In Step S108, the value of $T_j$ is compared with the threshold K. When $$T_j > K, \tag{8}$$

this j-node is not to be regarded as the destination node, so that it is deleted from the candidate node list in Step S109. Whether the number of candidate nodes has been reduced to "0" is examined in Step S110. Explanation regarding this point will be given below. If the comparison result in Step S108 is judged to be:

$$T_j < K, \tag{9}$$

this j-node can be considered not to be so deviated from the travel direction $D_P$ that it should be deleted from the candidates at this stage. Accordingly, the node is not deleted. The procedure then moves on to Step S120, where the distance $I_{Xj}$ between the current vehicle position $P_X(x, y)$ and the j-node is calculated. It is examined in Step S122 to see whether the distance $I_{Xj}$ has been reduced to a value not larger than 0. If $I_{Xj}$ is 0 or less, it implies that the j-node is the destination node. When $$I_{Xj} > 0 \tag{10}$$

the index j is incremented with a view to examining the next candidate node. The procedure then returns through Step S126 to Step S104. The cycle is repeated until a state corresponding to any one of the following (i) to (iii) is attained:

(i) It is found in Step S126 that the operations of Steps S104 to S124 have been executed for all the candidate nodes without either of the conditions of the following (ii) and (iii) being detected.

(ii) It is found in Step 110 that the number of remaining candidate nodes has been reduced to "0".

(iii) The vehicle is judged in Step S122 to have reached the destination node.

The condition of the above (i) will be explained. If the result of Step S126 is affirmative, the procedure returns to the main routine of FIG. 5. The corner detection subroutine of Step S22 is then executed to detect corners (as will be described below in detail), map matching being executed in Step S24. In accordance with the result of the map matching performed in Step S24, display in one of the following modes (a) to (c) is effected in Step S26:

(a) The current vehicle position $P_X(x, y)$ conjectured by the dead-reckoning method is displayed (Flag $F_A = 0$).

(b) The position of the arrival node is displayed ($F_A = 1$).

(c) The position of the node in the vicinity of the corner recognized is displayed ($F_C = 1$).

When the starting of the program of FIG. 5 is effected 32 times as a result of the subsequent 32 $R_{EV}$ pulses, a new travel direction $D_P$ and the current vehicle position $P_X(x, y)$ are calculated in Steps S8 and S14, respectively, the node search subroutine of FIG. 6A being executed.

As this operation is repeated, those nodes which apply to the condition:

$$T_j > K$$

are deleted one by one from the candidates.

Figure 7:
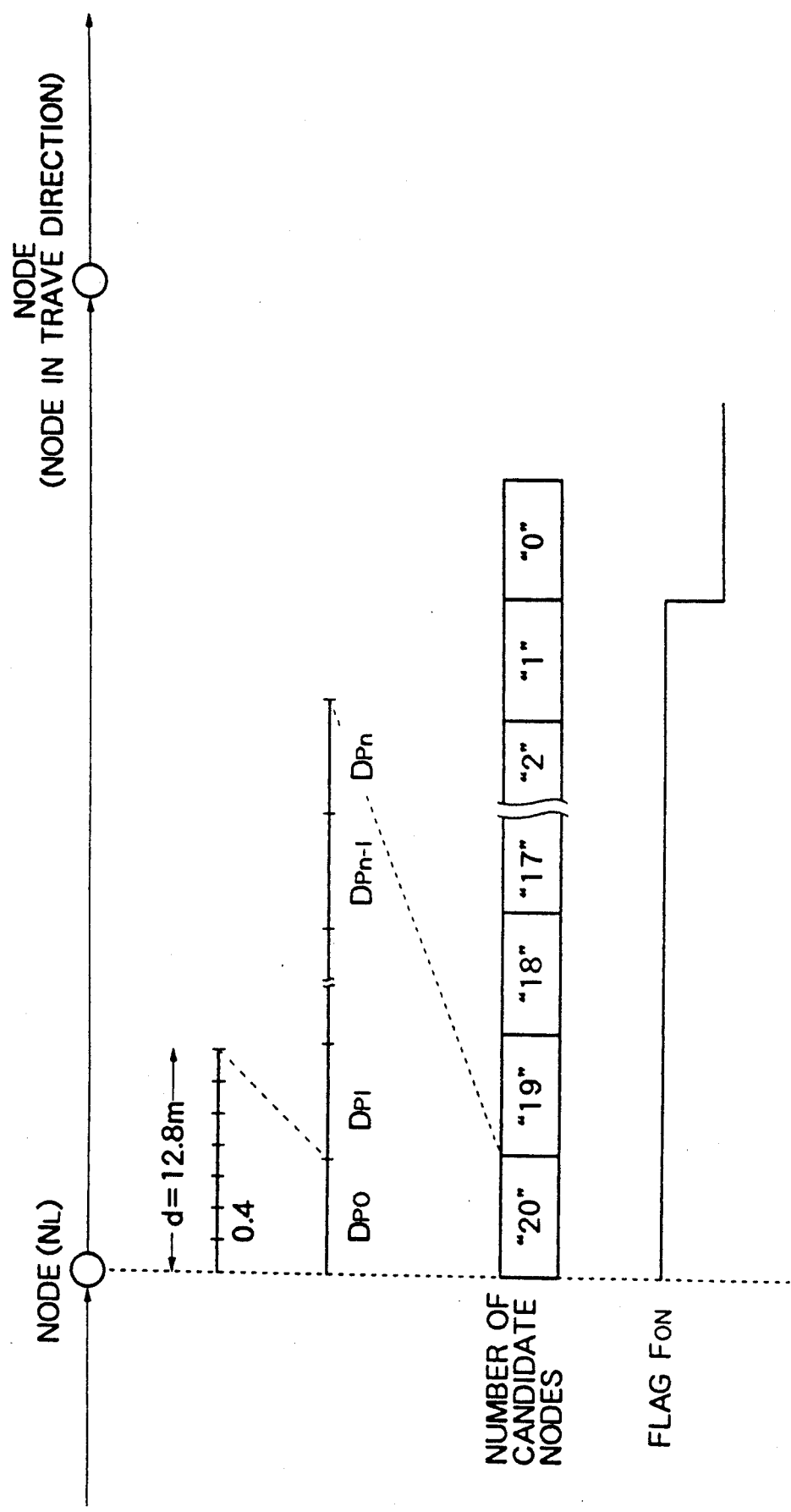
FIG. 7 schematically illustrates the control operation covering both memory and a non-memory roads.

FIG. 7 shows how the number of candidate nodes, which is 20 at first, is diminished one by one.

If the vehicle continues to travel on a memory road, it will sooner or later arrive at a node where $I_{Xj} \leq 0$ (Step S122). In that case, the procedure moves on to Step S130, where the node at which $I_{Xj} \leq 0$ is added to the arrival node list. Thus, a list of the nodes which the vehicle has passed up to the present is prepared in this Step S130. In Step S132, Flag $F_A$ indicating that the vehicle has reached a node is set to "1". As will be stated below, this Flag $F_A$ is utilized in map matching. In Step S134, the latest arrival node $N_L$ is updated, and, in Step 136, the counter n is set to "0". That is, the $D_{P0}$, $D_{P0}$,—$D_{Pn}$ which have been stored in memory until then are cleared "0". In Step 138, the road information such as the connective relationship with respect to the node $N_L$ reached by the vehicle last, is examined obtaining the connective relationship (FIG. 3B) and the connecting direction $D_C$ to prepare a candidate node list (FIG. 4).

NODE SEARCH (NON-MEMORY ROAD TRAVEL)

Next, explained will be the case where the number of candidate nodes is judged in Step S110 to have been reduced to 0 as a result of the repetition of the procedure of Step S109 in which the operation of deleting those nodes at which $T_j < K$ is performed. In this case, Flag $F_{ON}$ is set to "0" in Step S112 (see FIG. 7). That is, the vehicle is judged to be running on a non-memory road at the time when the number of candidates has become 0. In Step S113, the current vehicle position $P_X(x, y)$ is stored as the position $P_L(x, y)$ at which the vehicle has deviated from a memory road. In storing map information in the map information memory 13, the storage of map information on smaller roads may be intentionally omitted with a view to saving memory capacity. In such a case, nodes are generally provided on purpose at branch points where memory roads and non-memory roads part from each other. However, if, for example, new roads are constructed after road information has been stored in the map information memory 13, nodes cannot always be expected to exist at branch points mentioned above. This is why the point $P_X$ is stored in memory as the point $P_L$. The control procedure then returns to the main routine.

In the case of the example shown in FIG. 7, $F_{ON}$ is reset when the number of candidate nodes, 20 at first, has been reduced to "0".

When the vehicle has traveled another 12.8 m after thus storing in memory the point at which it left a memory road last (Steps S2 to S6), the travel direction $D_P$ as from the point $P_L$ is calculated in Step S8, and the current vehicle position $P_X(x, y)$ is calculated in Step S14, executing the node search subroutine of FIG. 6B.

This node search operation will now be schematically explained with reference to FIG. 10. In the example shown, the vehicle is deviated from a memory road at the point $P_L$, successively passing the points $P_{X0}$, $P_{X1}$, $P_{X2}$, $P_{X3}$ and $P_{X4}$ any two adjacent ones of which are separated from each other by 12.8 m. First, when the vehicle has reached the point $P_{X0}$, a circle is formed which has a radius r ($=r_1$) corresponding to the value obtained by multiplying the distance $L_X$ covered by the vehicle up to that time by a predetermined constant $\beta$. It is then examined to see whether any real nodes (i.e., nodes stored in memory) exist within this circle. If there are, this node $P_{X0}$ is established as a "virtual node". In the example shown in FIG. 10, nodes $N_1$ and $N_2$ exist in the circle whose radius $r_1$ is to be expressed as:

$$r_1 = \beta \times (\text{distance between } P_{X0} \text{ and } P_L) \quad (11)$$

Accordingly, the virtual node $N_1$ is established at the point $P_{X0}$. Here, "establishing a virtual node" means storing the position of that virtual node in the RAM 17 and registering it in a retrievable manner. In the example shown in FIG. 10, the respective connecting directions $D_{CIk}$ as seen from this virtual node $N_1$ to real nodes are calculated. Here, the k denotes the index for retrieving real nodes. The calculation of $D_{CIk}$ is performed on the basis of the current vehicle position $P_X$ conjectured by the dead-reckoning method and the coordinate values of the real nodes existing in the circle. Since the vehicle is relatively likely to reach one of these nodes existing in the circle, the nodes will be referred to as "candidate nodes" as in the memory road node search. The elimination algorithm adopted in deleting those nodes which are not likely to be the destination node from these candidate nodes substantially resembles that adopted in the memory road node search described above. That is, suppose the candidate nodes are to be nominated with the index k, the node search equations for the non-memory road node search will resemble equations (3) and (4) and be expressed as:

$$T_k = \frac{1}{C_k} \cdot \sum_{i=0}^{n} W(\theta_i) \cdot \theta_i \quad (12)$$

$$\theta_i = |D_{Pi} - D_{CIk}| \quad (13)$$

Figure 10:
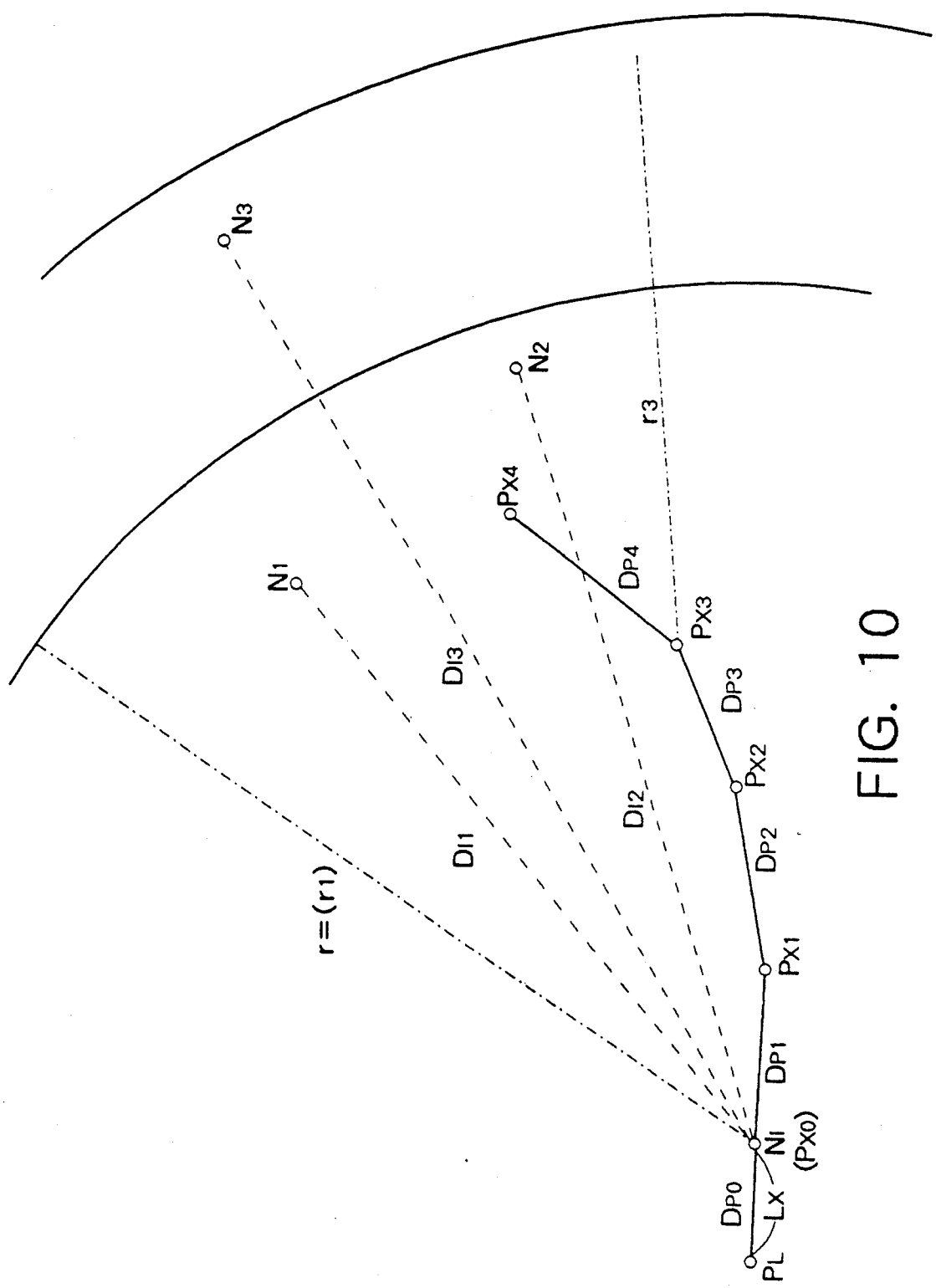
FIG. 10 schematically illustrates the operation of narrowing down the range of node choice when the vehicle is running on a non-memory road.

Thus, those nodes the value of the evaluation function $T_k$ of which is large are deleted from the candidates. Here, the denominator $C_k$ in the above equation will be explained as follows:

Since, in the case of the example shown in FIG. 10, two nodes $N_1$ and $N_2$ exist, the respective connecting directions $D_{CI1}$ and $D_{CI2}$ in which the current vehicle position and these nodes lie are calculated. Further, $$T_1 = W \times |D_{CI1} - D_{P0}| \quad (14)$$

$$T_2 = W \times |D_{CI2} - D_{P0}| \quad (15)$$

are respectively calculated for the nodes $N_1$ and $N_2$, the values of these $T_1$ and $T_2$ being compared with the threshold K'. Those nodes the evaluation value of which is larger than this threshold K' are deleted from the candidates. The value of this threshold K' differs from that of the threshold K adopted in the memory road node search described above. The value of K' is determined such that

K' < K.

As a result, the range of node choice in the non-memory road node search is narrowed down more rigidly than in the memory road node search.

The evaluation function when the vehicle has moved from $P_{X0}$ to $P_{X1}$ is to be expressed as:

$$T_1 = \tfrac{1}{2}\{W|D_{P0} - D_{CI1}| + W|D_{P1} - D_{CI1}|\}$$

$$T_2 = \tfrac{1}{2}\{W|D_{P0} - D_{CI2}| + W|D_{P1} - D_{CI2}|\}$$

When the vehicle has moved to $P_{X2}$, the evaluation is effected as:

$$T_1 = \tfrac{1}{3}\{W|D_{P0} - D_{CI1}| + W|D_{P1} - D_{CI1}| + W|D_{P2} - D_{CI1}|\}$$

$$T_2 = \tfrac{1}{3}\{W|D_{P0} - D_{CI2}| + W|D_{P1} - D_{CI2}| + W|D_{P2} - D_{CI2}|\}$$

The denominator $C_k$ in the above evaluation equation constitutes, as in the memory road node search, the number of $D_P$ as seen from $P_L$. It is to be noted, in this regard, that, in the case of the non-memory road node search, the number of candidate nodes constitutes a problem. In the case of the memory road node search, the next target node is logically always sure to exist within the above-mentioned circle having the radius $r_1$ calculated at first. If, however, the vehicle is running on a non-memory road, there is no guarantee of the target node existing within the circle having the radius $r_1$. In view of this, the following arrangement is adopted in this embodiment: as the vehicle moves along while successively passing the points $P_{X0}$, $P_{X1}$, $P_{X2}$, $P_{X3}$ and $P_{X4}$, $r = \beta \times L_X$ ($L_X$: total travel distance covered by the vehicle from the point $P_L$ to each $P_X$) is calculated for each of these points, examining to see whether any real nodes have newly been discovered within each of the circles having the radius r. If, for example, the vehicle has moved to $P_{X3}$, the sum of the respective distances between $P_L$ and $P_{X0}$, $P_{X0}$ and $P_{X1}$, $P_{X1}$ and $P_{X2}$, and $P_{X2}$ and $P_{X3}$ is applied to the above equation as $L_X$. If new nodes are found within this new search area, these newly found nodes are included in the list as candidate nodes. In such cases, it should be considered how to evaluate the respective directions of the connections between the virtual node and these newly found candidate nodes. That is, it should be considered as to whether the travel direction data $D_P$ stored and retained until these candidate nodes are found are to be regarded as the object of the calculation performed using equations (12) and (13).

This will be explained in more detail. Suppose no nodes are found until the arrival of the vehicle at $P_{X2}$ after the discovery of the candidate nodes $N_1$ and $N_2$ at $P_{X0}$ and a new node $N_3$ has been found at $P_{X3}$ within the circle which has the radius $r_3$, a judgment should be made as to whether the evaluation function $T_3$ of this new node $N_3$ should be expressed as:

$$T_3 = \tfrac{1}{4}\{W|D_{P0} - D_{CI3}| + W|D_{P1} - D_{CI3}| + W|D_{P2} - D_{CI3}| + W|D_{P3} - D_{CI3}|\} \quad (16)$$

or as:

$$T_3 = W|D_{P3} - D_{CI3}| \quad (17)$$

To state the conclusion first, this embodiment employs the latter type of evaluation function represented by equation (17). That is, when new nodes are discovered, only that travel direction data obtained at the time of discovery and thereafter (in the example shown in FIG. 10, $D_{P3}$ alone) is treated as the object of evaluation. If the vehicle further moves from $P_{X3}$ to $P_{X4}$, the new node $N_3$ is evaluated on the basis of $D_{P3}$ and $D_{P4}$.

The reason for doing this is as follows: first, it will be understood that non-memory roads are generated mainly because smaller roads are not stored in memory due to the limited memory capacity for road information. Accordingly, it is only when such smaller roads are substantially straight ones that they can be omitted in the memory. In other words, those smaller roads which are curved to a large degree should be stored in memory as roads equipped with node information. If the navigation system of this invention is constructed after this memory standard, the roads intentionally omitted in the memory will be straight ones, the vehicle travel direction thereon also being straight. Consequently, in the example shown in FIG. 10, the evaluation of the newly discovered node will give the same result, whether it is performed from $P_L$ or from the newly discovered point (which is $P_{X3}$ in the example of FIG. 10).

However, if there exists a newly constructed road, it is not to be evaluated to what degree it is curved. If the non-memory road is actually curved to a large degree, evaluating the newly found node on the basis of $D_P$ information including the previously stored data will result in the errors being increased. For example, if the actual non-memory road is greatly curved as at $P_{X3}$ in FIG. 10, adding the travel direction data $D_{P0}$ to $D_{P3}$ to the data used for the node search evaluation will no doubt result in the evaluation errors being increased. For this reason, the travel direction data $D_P$ stored previously is not used in equations (12) and (13) for examining any newly found candidate data to see whether it is the target node.

Referring again to FIG. 6B, the control operation performed when the vehicle is traveling on a non-memory road will be described in detail.

First, the node arrival flag $F_A$ is reset in Step S150. In Step S151, the total travel distance $L_X$ covered by the vehicle between the point $P_L$ at which the vehicle has left a memory road and the current vehicle position $P_X$ is calculated. In Step S152, a circle having a radius r which is to be expressed as:

$$r = L_X \times \beta$$

is formed, and it is examined to see whether there are any real nodes within the circle. In this example, the value of $\beta$ is set at 20% ($=0.2$). In accordance with the above equation, the radius r will be enlarged as the travel distance $L_X$ increases, resulting in the number of candidate nodes becoming larger and larger. In view of this, the following range is set for the value of r:

$$50\text{ m} \leq r \leq 500\text{ m} \quad (18)$$

If, in Step S154, no nodes are judged to be in the search area, the flag $F_N$ is examined in Step S156. This flag $F_N$ serves to indicate that a virtual node is being set. If no virtual node is being set, the procedure moves on to Step S158, deleting the $D_{PI}$ stored in Step S10 (FIG. 5). This is effected the previous travel direction data may be ignored until a virtual node has been set. After that, the procedure returns to the main routine.

When, after returning to the main routine, the vehicle runs another 12.8 m, and the control process of FIG. 6B is executed, the steps to be taken are as follows:

If some nodes are found in the circle in Step S154, the procedure moves on to Step S160, where it is checked to see whether the flag $F_N$ is set. The virtual node $N_1$ is established in Step S164 only then when the flag is not set in Step S162. That is, the flag $F_N$ is set in Step S164, and, in order to set the virtual node $N_I$ at the current vehicle position $P_X$ in Step S164, the point $P_X$ is established as the virtual node point $P_1$. In Step S166, the real nodes found in Step S154 are established as candidate nodes $N_k$, preparing a connective relationship list of the respective connections between these candidate nodes $N_k$ and the virtual node $N_I$. The connecting direction data $D_{CIk}$ on the connection between the k-th candidate node $N_k$ and the virtual node $N_I$ is prepared for each of the candidate nodes found within the circle. In Step S168, the counter $C_k$ for each of the candidate nodes $N_k$ is initialized to 1, the procedure then returning to the main routine.

The condition: $C_k = 1$ implies that what should be evaluated as the travel direction data is the value of one $D_P$ set in Step S10 because the previously stored $D_P$ data has been deleted in Step S158. Thus, the flag $F_N$ indicating that a virtual node has been established is set is set to 1.

Next, the operation control while the flag $F_N = 1$ will be described.

When the vehicle has advanced another 12.8 m and the procedure has moved on to Step S154, it is examined to see whether or not any nodes exist within the circle whose radius r is calculated in Step S152. Generally speaking, the same nodes as previously found are likely to be found again. In that case, the procedure moves from Step S160 to Step S174 to examine to see whether the nodes discovered include any new ones added to the previously detected candidate nodes. If no new nodes are included, the procedures moves to Step S182, incrementing the counter $C_k$ for storing the number of travel direction data pieces $D_P$ that should be evaluated. In the case of the example shown in FIG. 10, no candidate nodes are discovered between $P_{X1}$ and $P_{X2}$, so that the value of the counter $C_k$ should be such that $C_1 = C_2 = 3$ to indicate that $D_{P0}$ to $D_{P2}$ are used in evaluating the candidate nodes $N_1$ and $N_2$.

If some new candidate nodes are found in Step S174, candidate node lists $N_k$, $D_{CIk}$ is prepared in Step S176. For these new candidate nodes, the value of $C_k$ is set as:

$$C_k = 1,$$

and, for the existing candidate nodes, the $C_k$ value is set as:

$$C_k = C_k + 1$$

Thus, in addition to the previously detected candidate nodes, a set of newly found candidate nodes constitute the object of the target node evaluation to be conducted in Step S194.

After executing Step S180 or Step S182 of FIG. 6B, the procedure moves on to Step S190 of FIG. 6C.

If, after attaining the condition: $F_N=1$, the number of candidate nodes in the circle is reduced to 0 in Step S154, the procedure moves from Step S156 to Step S174, then to Step S182 as long as no previously found candidate nodes have been deleted ($F_N=1$). After attaining the condition:

$$C_k = C_k + 1$$

for the remaining candidate nodes, the procedure returns to the main routine.

The program of FIG. 6C will now be explained. What is performed with this program is to control the evaluation of each candidate node as the target node.

In Step S190, the subscript k nominating the candidate nodes is initialized. Every one of the candidate nodes is evaluated as the target node through the loop: Step S192 → Step S204→Step S192. Thus, in Step S192, the direction difference $\theta_1$ between the connecting direction $D_{CIk}$ in which each of the candidate nodes $N_k$ nominated by k and the virtual node $N_I$ lie and the travel direction data $D_{Pi}$ is calculated from equation (13):

$$\theta_i = |D_{Pi} - D_{CIk}|$$

Then, in Step S194, the evaluation function $T_k$ is calculated for the candidate node $N_k$ on the basis of the latest travel directions $D_{Pi}$ of the number corresponding to that retained by the counter $C_k$ of this candidate node, in accordance with equation (12):

$$T_k = \frac{1}{C_k} \cdot \sum_{i=0}^{n} W \cdot \theta_i$$

This $T_k$ is then compared with the threshold K' in Step S196, making a judgment as to whether or not this candidate node $N_k$ should be deleted.

If the $T_k$ value is less than this threshold, the distance $I_{Xk}$ between the current position $P_X(x, y)$ and the candidate node concerned is calculated in Step S198, making a judgement in Step S200 as to whether or not the vehicle has come to a position close enough to that candidate nodes. If not, the procedure moves on in the order: Step S202→Step S204→Step S192, repeating the above control operation.

If, in Step S196, $$T_k > K',$$

that candidate node k is deleted from the candidate node list in Step S230. If, in Step S232, some candidate node still remain, the procedure moves to Step S202, performing the above control operation.

The case where, in Step S200, $$I_{Xk} \leq 0$$

will now be explained. In that case, the candidate node k concerned is incorporated into the list as an arrival node in Step S210, and the flag $F_N$ is reset in Step S212. At the same time, the flag $F_{ON}$ is set as:

$$F_{ON} = 1$$

for the purpose of storing in memory the fact that the vehicle has been restored to a memory road. In Step S214, this arrival node is stored in memory as the latest arrival node $N_L$. In Step S216, the arrival flag $F_A$ is set as:

$$F_A = 1$$

In Step S 218, a list of the candidate node to which the vehicle can move from this arrival node is prepared for the node search control of FIG. 6A. This arrival node list is used in the node search control (FIG. 6A). In Step S220, the list of the candidate nodes $N_k$ is cleared.

If, in Step S232, it is decided that no remaining candidate nodes are to be found, the procedure moves on to Step S234, where the flag $F_N$ is reset. Since the previous virtual nodes $N_I$ are now to be regarded as meaningless, the candidate list is entirely deleted in Step S236. Then, in Step S238, the current vehicle position is newly established as the point $P_L$ at which the vehicle has been deviated from a memory road, repeating the same control process again, from Step S150 of FIG. 6B onward. That is, the control operations are repeated in the order: candidate node search→virtual node setting→candidate node evaluation.

It will now be explained, with reference to FIG. 11, why the operation of virtual node setting is repeated in Step S164, etc., even when all of those candidate nodes evaluated with respect to the once established virtual nodes have been deleted from the candidate nodes. In FIGS. 11(a) to 11(e), the symbols O, the dashed lines, the one-dot chain line and the solid lines indicate nodes, memory roads, a non-memory road and a vehicle travel locus, respectively. Suppose the vehicle has traveled in the way shown in FIG. 11(b) and a virtual node is established at the time when it enters the non-memory road. At this time, the flag $F_N$ is set to "1". Straight "virtual roads" can be drawn from this virtual node $N_I$ to the nodes $N_3$ and $N_4$, of which $N_3$ is regarded as deleted from the candidates through the control process described above. Suppose the vehicle has further moved along in the manner shown in FIG. 11(c), resulting in $N_4$ also being deleted ($F_N=0$). When the vehicle travels further until a virtual node is again established ($F_N=1$) as shown in FIG. 11(d), the node $N_4$ is again regarded as a destination candidate node. However, since the connecting directions and the travel directions of this node $N_4$ and the virtual node differ from each other to a large degree, this $N_4$ node is deleted from the candidates, $F_N$ being set to 0 again.

When the vehicle has returned to a memory road, as shown in FIG. 11(e), a virtual node is established again since the point at which the vehicle has entered the memory road is not a node. Then, the node $N_4$ is again established as a candidate node, the vehicle traveling toward the node. Since at this time the connecting direction of the virtual node and $N_4$ coincides with the vehicle travel direction, $N_4$ continues to be recognized as a candidate node which is relatively likely to be a target node until the vehicle reaches this node.

As will be understood, the operation of narrowing down the range of choice of a target node from among candidate nodes obtained on the basis of virtual nodes established during non-memory road travel can prove unsuccessful. However, it can happen that the vehicle returns from a non-memory road to a point on a memory road where no node is provided. In such a case, a virtual node must be established again, as stated above.

CORNER DETECTION

Next, the principle of the corner detection control will be explained with reference to FIG. 12. The node setting in this embodiment is effected such that, on straight roads, a node appears before the errors in positional detection by the dead-reckoning method have become excessively large. In addition to this, every intersection, curve, corner, etc., is equipped with a node. Accordingly, each time an intersection, a curve, a corner or the like is detected, the vehicle position is map-matched to the node in the vicinity thereof. The vehicle is judged to have passed a corner when a remarkable change is detected in the configuration of the road in the vehicle travel direction.

Figure 12:
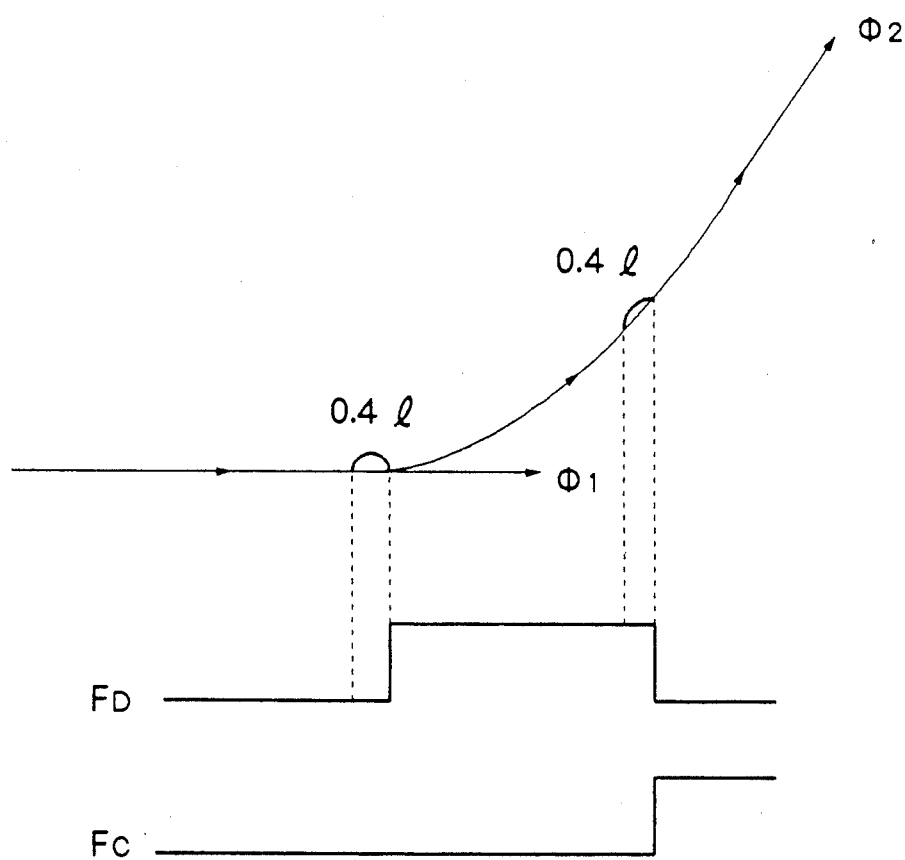
FIG. 12 is a chart showing the principle of the corner detecting operation.

In the example shown in FIG. 12, the flag $F_D$ is set when the vehicle is judged to have moved from a straight to a curved road from travel direction data $D_P$ collected 1 times (which corresponds to $0.4 \times 1$ m travel distance). When, after setting this flag, the vehicle is judged to have returned to a straight road from travel direction data $D_P$ collected 1 times (which corresponds to $0.4 \times 1$ m travel distance), the vehicle is judged to be out of the corner. The flag $F_D$ is then reset, and the corner detection flag $F_C$ set. When this flag $F_C$ is set, the map matching of Step S24 (FIG. 5) is conducted to find a nearby node, to which the current vehicle position is corrected.

Suppose the vehicle is now running on a straight road and approaching a corner. The corner detection control in this condition will be explained with reference to FIG. 6D.

First, the latest 1 pieces of travel direction data $D_{Pi}$ are read in Step S300, integrating (obtaining the moving average of) this $D_{Pi}$ data in Step S301 to estimate the mean travel direction over 0.41 m distance.

$$\text{Average value} = \frac{\Sigma D_{Pi}}{l} \quad (19)$$

In Step S 302, the difference between the previous and current average values is calculated. It is examined, in Step S303, to see whether or not this difference is larger than a certain threshold, thereby making a judgment as to whether the vehicle is running on a straight road. If the vehicle is judged to be on a straight road, the setting condition of the flag $F_D$ is examined in Step S304. Since, in the present case, the vehicle was judged to be running on a straight road on the previous examination, $F_D=0$. Accordingly, the moving average value calculated in Step S301 is stored in memory in Step S306 as the straight road travel direction $\Phi_1$, the procedure returning to the main routine. The travel direction $\Phi_1$ can be expressed as follows:

$$\Phi_1 = \frac{\Sigma D_{Pi}}{l} \quad (20)$$

When the vehicle further travel afterwards and enters a curved road, the procedure moves from Step S303 to Step S308. Since $F_D=0$ at this time, the procedure moves from Step S308 to Step S310, the flag $F_D$ being set to "1" in order to store in memory the fact that the vehicle has entered a corner. After thus attaining the condition:

$$F_D = 1,$$

the procedure returns to the main routine. While the vehicle is traveling further with curved road travel being detected, the operational flow: Step S300→Step S303→Step S308→ main routine is repeated.

When the vehicle has entered a straight road again, the procedure moves from Step S300 to Step S301 to calculate the moving average value. The procedure then further moves in the order: Step S303→Step S304→Step S312. Here, the flag $F_D$ is reset, and, in Step 314, the average value calculated in Step S301 is established as the travel direction $\Phi_2$ after the vehicle has got out of the corner.

$$\Phi_2 = \frac{\Sigma D_{Pi}}{l}$$

Further, in Step S316, the absolute value $\Delta\Phi$ of the difference between the travel directions before entering and after leaving the corner is obtained.

$$\Delta\Phi = |\Phi_1 - \Phi_2| \quad (2)$$

In Step S317, the following condition is set up in order to detect the next corner:

$$\Phi_1 = \Phi_2 \quad (22)$$

This $\Delta\Phi$ is compared with the threshold H in Step S318, making a judgment, from the comparison result, as to whether or not the corner detected is a real one. If $$\Delta\Phi \leq H,$$

the procedure returns to the main routine. If, on the other hand, $$\Delta\Phi > H,$$

it is decided that a real corner has been detected through the control operations that have been performed, the flag $F_C$ being set as follows:

$$F_C = 1$$

Then, in Step S322, the current vehicle position $P_X(x, y)$ (the point at which the vehicle has left the corner) is stored in memory as the corner position $P_C(x, y)$. That is, $$P_C(x, y) = P_X(x, y)$$

Thus, a real corner can be detected, preventing curves of a noise-like character from being detected as corners by mistake. The corner detection result is retained as the flag $F_C$ and the corner point $P_C(x, y)$.

MAP MATCHING

The map-matching control process will now be explained with reference to FIG. 6E.

The flags influencing the map-matching control are the node arrival flag $F_A$ and the corner detection flag $F_C$.

WHEN $F_A 0$ AND $F_C = 0$

The vehicle is traveling on either a memory road or a non-memory road, and, at the same time, it is running between nodes. In this case, the current position $P_X(x, y)$ conjectured in Step S14 by the dead-reckoning method is established in Step S404 as the position $P_D(x, y)$ to be displayed on the display 14.

WHEN $F_A=1$

The vehicle has either reached a node after traveling a memory road (Step S130) or reached a real node after returning from a non-memory road to a memory road (Step S210). In either case, the current vehicle position $P_X(x, y)$ is corrected, in Step S402, to the coordinate position (stored in memory as $N_L$ in Step S134) of the arrival node. Further, in Step S403, the position of this arrival node is established as the display position $P_D$.

WHEN $F_C=1$

A corner has been detected. First, it is examined in Step S408 to see whether any nodes exist within a certain area having as its center the corner position $P_C(x, y)$ detected in Step S322. If no nodes are found within the area, the position $P_X(x, y)$ conjectured in Step S14 by the dead-reckoning method is established, in Step 414, as the position $P_D(x, y)$ to be displayed on the display 14.

In this way, navigation control during memory or non-memory road travel, at the time of node arrival, or during corner travel, can be realized.

MODIFICATIONS OF THE METHOD OF NARROWING DOWN THE CANDIDATE NODE CHOICE RANGE

In the above-described embodiment, the weight function W used in calculating the evaluation function T for excluding candidate nodes during node search has the characteristic shown in FIG. 9. The larger the direction difference $\theta$ (between the travel direction $D_P$ and the connecting direction $D_P$), the larger the value of the function. This is based on the idea that those nodes which are deviated from the vehicle travel direction $D_P$ to a large degree should be excluded from the candidates as soon as possible. In the above embodiment, this characteristic is imparted equally to all the roads. The candidate node choice process during memory road travel (Step S108) only differs from that during non-memory road travel (Step S196) in that the node choice criterion is more rigid in the latter than in the former, the thresholds K and K' to be compared with the evaluation function T being determined such that $K' < K$. In view of this, some modifications of the method of narrowing down the candidate node choice range will be described below:

These modifications help to vary the mode of narrowing down the node choice range in accordance with the road types.

MODIFICATION OF THE WEIGHT FUNCTION W

Figure 13A:
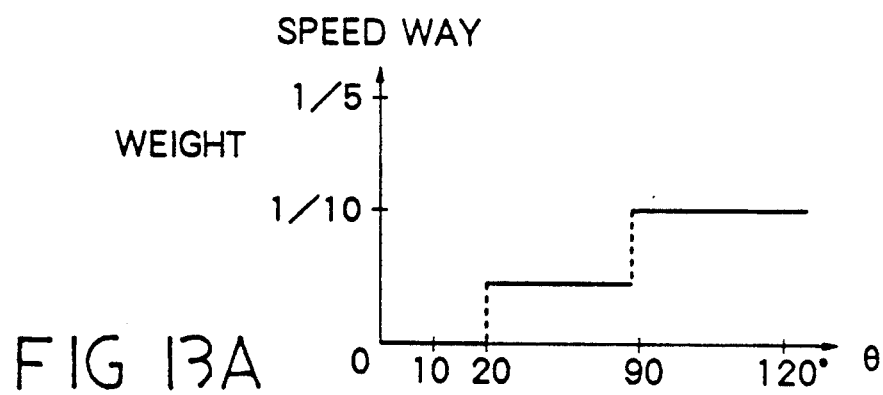
FIG. 13 illustrates the characteristics of the weight function in a modification.
Figure 13B:
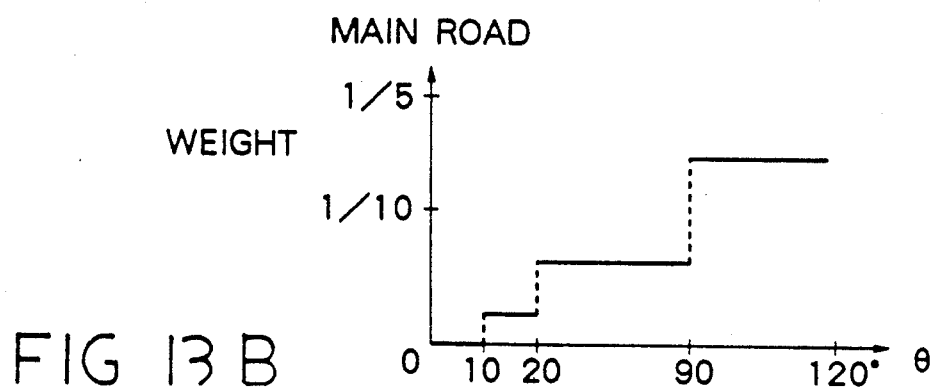
Figure 13C:
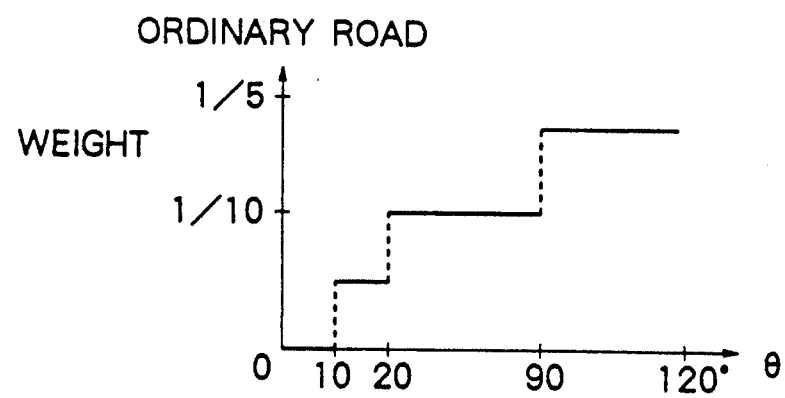
Figures 14, 15:
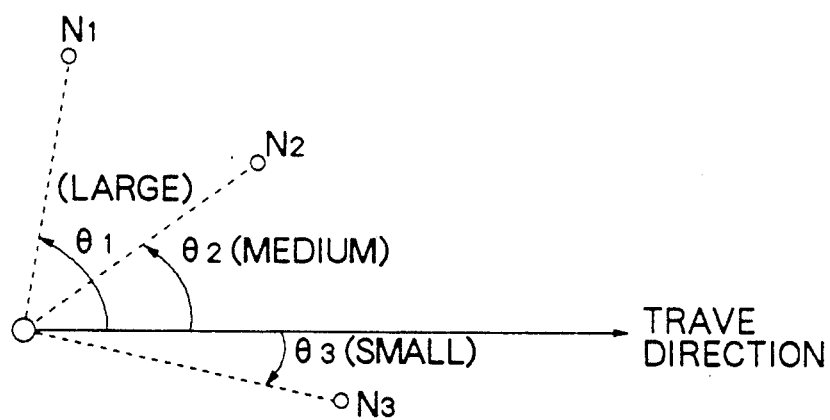
FIG. 14 shows the mode of data storage in a modification.
FIG. 15 illustrates the principle of the weight function.

In this modification, the characteristic of the weight function W is such that it exhibits different values for different road types (e.g., speedway, main road, and ordinary road) in accordance with the direction difference $\theta$ (the difference between the vehicle travel direction and the node connecting direction $D_C$) which is represented by equation (4). In the example shown in FIG. 15, the weight W varies in accordance with this direction difference $\theta$. FIG. 15 shows the general characteristic of the weight W which increases in such a manner that, the larger the direction difference $\theta$, the larger the value of the evaluation function T. As shown in FIG. 13, the weight W is relatively large in the case of a road which is of less significance as compared in the case of more significant type of roads. The reason for this arrangement is as follows:

Suppose the vehicle is traveling on a speedway. In this case, the vehicle will not be deviated from the road to a large degree except when entering interchanges or service areas. Accordingly, when the vehicle is running on a speedway, it is not necessary to exclude those candidate nodes involving large direction differences $\theta$ by a rigid criterion in accordance with the criterion equations (8) and (9) for node deletion. In other words, the criterion may be less rigid, and even those nodes which are not likely to be the target can be "positively" included ("map-matched) in the candidates. From this point of view, it is arranged such that, the more straight the road, the smaller the value of the weight function W, as shown in FIG. 13, so that the direction difference $\theta$ may have as little influence as possible on the evaluation function T.

The weight function W is stored in the memory 13 in the manner shown in FIG. 14 along with the node information, etc. In Step S106 (FIG. 6A) or Step S194 (FIG. 6C), the type of weight function W is selected from among (a) to (c) of FIG. 13 in accordance with the type of the road to which the node $N_L$ reached by the vehicle as the last one.

MODIFICATION WITH DIFFERENT THRESHOLDS K, K'

From the same reason as in the case of the weight function W described above, the threshold K may be varied in accordance with the road types. It is arranged such that, the more straight the road, the larger the threshold K, thereby lowering the possibility of nodes thereon being excluded from the candidates.

MODIFICATION WITH DIFFERENT MAP-MATCHING FREQUENCY

From the same reason as in the case of the above-described weight function W, the frequency with which map matching is conducted may be varied in accordance with the road types. In other words, it may be arranged such that, the more straight the road, the less the frequency with which map matching is conducted. If map matching is conducted less frequently, the errors in the dead-reckoning increases. However, in the case of a road which exhibits a high degree of straightness, those nodes which would be excluded from the candidates in the usual control due to the increased errors can be retained as candidates and be map-matched "forcibly" to some degree.

It goes without saying that the above-described modifications in which the mode of narrowing down the node choice is varied in accordance with the road types can be applied to the conventional map-matching methods which do not adopt the concept of nodes.

POSITIVE EFFECTS OF THE EMBODIMENT

The embodiment described above provides the following positive effects:

E1: Nodes at which map matching is to be conducted are provided not only at peculiar points on the map, but also on a periodic basis at points on the road at predetermined intervals (which are not necessarily equal to each other), so that map matching can be conducted before the errors in assumed vehicle positions conjectured by the dead-reckoning method have increased to an excessive degree, thereby preventing the vehicle position from being map-matched on the wrong node. Furthermore, by executing map matching, the above-mentioned errors can be canceled, thus retaining the accuracy of the dead-reckoning and the map matching conducted thereafter.

E2: When searching for those nodes to which the traveling vehicle can move (i.e., candidate nodes), the search area is enlarged in accordance with the distance covered by the vehicle which is guided by the dead-reckoning method (Step S152), it is less possible for target nodes to be left off the area concerned even though the dead-reckoning method itself inevitably involves some errors.

E3: In narrowing down the range of node choice during memory road travel and in narrowing down the range of node choice to specify a target node during non-memory road travel, the calculation of the evaluation function $T_n$ is conducted after effecting weighting in accordance with the direction difference $\theta$, so that the accuracy of the narrowing down is improved.

E4: The threshold used for the weighting in the node choice range narrowing down during memory road travel and the threshold used for the weighting in the node choice range narrowing down for specifying a target node during non-memory road travel, are determined such that the narrowing down is effected more rigidly in the latter than in the former case, so that the inevitable deterioration in accuracy due to the fact that there is no other resource than the dead-reckoning method, can be compensated for.

E5: When narrowing down the node choice range during non-memory road travel, the target node is specified taking into account not only the distance ($I_{Xk}$) between the current vehicle position and the target node but also the relevant directions (travel direction $D_P$ and the node connecting direction $D_C$), so that the target node can be specified more accurately.

E6: When the vehicle is traveling on a non-memory road, the operation of setting virtual nodes is repeated a number of time even when there are no candidate nodes left, so that navigation control can be effected correctly even when the vehicle is restored to a memory road at a point which does not constitute a node.

E7: In conventional methods of map matching, the current position of a vehicle running on a newly constructed road which is not stored in memory would be "forcibly" map-matched onto a memory road. In contrast, the present embodiment is designed to recognize such a condition as "non-memory road travel", so that erroneous map matching can be avoided, thereby relatively improving the accuracy of the navigation.

While the preferred form of this invention has been described, it is to be understood that various modifications can be made without departing from the spirit of the invention. Accordingly, the scope of this invention should be determined by the accompanying claims.

What is claimed is:

1. An apparatus for navigating vehicle comprising:
a conjecture means for conjecturing the current position of a vehicle by a dead-reckoning method on the basis of the vehicle travel direction and the vehicle travel distance;
a node storage means for storing road information in the form of the positions of a plurality of nodes provided on the roads concerned,
a non-memory road judging means for making a judgment as to whether or not the road on which the vehicle is running is one which is stored in said storage means, and
a target node specifying means for specifying, when the vehicle is judged by said non-memory road judging means to be traveling on a road which is not stored in said node storage means, a target node toward which the vehicle is running, comprising:
a first candidate node extracting means for extracting candidate nodes from said plurality of nodes stored in said node storage means;
a determining means for determining if the candidate nodes cannot be the target node by comparing the respective directions between a conjectured current position of the vehicle and these candidate nodes with the direction in which the vehicle is running; and
a first deleting means for deleting a candidate node which is determined not able to be the target node from the candidate nodes.

2. An apparatus for navigating vehicle according to claim 1, wherein said node storage means further stores the connective relationship between the nodes, and wherein
said non-memory road judging means includes:
a second candidate node extracting means for extracting from said node storage means a plurality of nodes connected to a start node as target candidate nodes,
a second node deleting means for identifying from among these candidate nodes those nodes which cannot be the target node by comparing the directions of the respective connections between the current vehicle position and these candidate nodes with the direction in which the vehicle is traveling and for deleting the nodes thus identified from the candidate nodes, and
a determining means for judging the vehicle to be running on a non-memory road when the number of candidate nodes has been reduced to zero.

3. An apparatus for navigating vehicle according to claim 1, wherein said node storage means further stores the connective relationship between the nodes, and wherein
said first extracting means includes:
a search area setting means for setting a search area corresponding to the travel distance covered by the vehicle from the time when the vehicle is judged to be running on a non-memory road to the present; and
extracts said candidate nodes from a plurality of nodes existing within this search area.

4. An apparatus for navigating vehicle comprising:
a conjecture means for conjecturing the current position of a vehicle by a dead-reckoning method on the basis of the vehicle travel direction and the vehicle travel distance;
a node storage means for storing road information in the form of the positions of a plurality of nodes provided on the roads concerned;
a non-memory road judging means for making a judgment as to whether or not the road on which the vehicle is running is one which is stored in said storage means; and
a target node specifying means for specifying, when the vehicle is judged by said non-memory road judging means to be traveling on a road which is not stored in said node storage means, a target node toward which the vehicle is running, comprising:

a candidate node extracting means for extracting candidate nodes from said plurality of nodes stored in said node storage means;

an average travel direction storage means for storing the average travel direction value for each of the respective travel distance units covered, and an angle difference calculating means for calculating, when the vehicle is judged by said non-memory road judging means to be running on a non-memory road, the average value, for each of the candidate nodes, of the angle difference between the data on the directions of the respective connections between the current vehicle position and the candidate nodes and the data on a plurality of stored average travel direction values for the respective travel distance units; and a deleting means for deleting those nodes which involve an angle difference exceeding a first predetermined value from the candidate nodes.

5. An apparatus for navigating vehicle according to claim 4, wherein said target node specifying means includes:

a control means for operating said search area specifying means and said second candidate node extracting means for each vehicle travel over a predetermined distance;

the calculation of the average of the angle differences of any new candidate nodes detected by said second candidate node extracting means when a new search area is set by said search area specifying means being performed by said angle distance calculating means using the average travel direction data which is stored after these new candidate nodes are detected.

6. An apparatus for navigating vehicle according to claim 3, wherein said second node deleting means employs a threshold comparison means including a weighting function, the magnitude of which is related to the angle difference between the present vehicle course and the angular direction to the candidate node and the type of road upon which the vehicle is traveling.

7. An apparatus for navigating a vehicle according to claim 6, wherein the magnitude of said weighting function decreases as the quality of the road upon which the vehicle is traveling improves to enable more candidate nodes to be considered when traveling on higher quality roads and less to be considered when traveling on lesser quality roads.

8. An apparatus for navigating vehicle according to claim 1, wherein said search area consists of a circle having a radius which is in proportion to the total travel distance covered by the vehicle from the time when the vehicle is judged to be running on a non-memory road to the present.

9. An apparatus for navigating vehicle according to claim 8, wherein the radius of said circle corresponds to a value obtained by multiplying by a constant which is one or less the travel distance covered by the vehicle from the time at which the vehicle is judged to be running on a non-memory road to the present.

10. An apparatus for navigating vehicle according to claim 8, wherein an upper and a lower limit are established to the radius of said circle.

11. An apparatus for navigating vehicle according to claim 1, wherein the apparatus is further equipped with a means for judging the vehicle to have returned to a memory road whenever a node is specified by said target node specifying means.

12. An apparatus for navigating vehicle according to claim 1, wherein the apparatus further comprises:

a third extracting means for further extracting a plurality of candidate nodes from among the nodes stored in the storage means, when the number of the candidate nodes is zero while the target node has not been specified.

13. An apparatus for navigating vehicle according to claim 1, wherein said target node specifying means has a map-matching means for map-matching the current vehicle position with a specified node.

14. An apparatus for navigating vehicle according to claim 13, wherein said map-matching means performs map matching when the distance between a node specified by said target node specifying means and the current vehicle position is not larger than a second predetermined value.

* * * * *

UNITED STATES PATENT AND TRADEMARK OFFICE
CERTIFICATE OF CORRECTION

PATENT NO. : 5,046,011

DATED : September 3, 1991

INVENTOR(S) : Masaki Kakihara et al.

It is certified that error appears in the above-identified patent and that said Letters Patent is hereby corrected as shown below:

Column 6, line 65:
"apparatus 11" should be --apparatus 10--;

Column 6, line 66:
"sensor 10" should be --sensor 11--;

Column 7, line 29:
"oh" should be --on--;

Column 8, line 24:
"32 0)" should be -- = 0) --;

Column 8, line 47:
"IKk" should be --Ixk--;

Column 12, line 33:
"DPO" should be --changing "$D_{p0}$" to --$D_{p1}$--.

Column 20, line 22:
"(2)" should be --(21)--;

UNITED STATES PATENT AND TRADEMARK OFFICE
CERTIFICATE OF CORRECTION

PATENT NO. : 5,046,011
DATED : September 3, 1991
INVENTOR(S) : Masaki Kakihara et al.

It is certified that error appears in the above-identified patent and that said Letters Patent is hereby corrected as shown below:

Column 25, Claim 4, line 11:
"difference" should be --differences--.

Signed and Sealed this

Sixth Day of July, 1993

Attest:

MICHAEL K. KIRK

Attesting Officer

Acting Commissioner of Patents and Trademarks